(12) United States Patent
Kazuhiro

(10) Patent No.: US 9,198,127 B2
(45) Date of Patent: Nov. 24, 2015

(54) COMMUNICATION DEVICE

(76) Inventor: Yamamoto Kazuhiro, Tokyo (JP)

( * ) Notice: Subject to any disclaimer, the term of this patent is extended or adjusted under 35 U.S.C. 154(b) by 0 days.

(21) Appl. No.: 13/881,404

(22) PCT Filed: Oct. 24, 2011

(86) PCT No.: PCT/JP2011/074464
§ 371 (c)(1),
(2), (4) Date: Jul. 16, 2013

(87) PCT Pub. No.: WO2012/057094
PCT Pub. Date: May 3, 2012

(65) Prior Publication Data
US 2013/0310020 A1 Nov. 21, 2013

(30) Foreign Application Priority Data
Oct. 25, 2010 (JP) .................................. 2010-238583

(51) Int. Cl.
*H04B 7/185* (2006.01)
*H04B 7/216* (2006.01)
(Continued)

(52) U.S. Cl.
CPC ........ *H04W 52/0209* (2013.01); *H04W 52/367* (2013.01); *H04W 52/0254* (2013.01); *Y02B 60/50* (2013.01)

(58) Field of Classification Search
CPC . H04B 7/18543; H04B 7/216; H04W 52/281; H04W 52/283; H04W 52/343; H04W 52/346
USPC ......... 455/67.11, 67.13, 69, 78, 115.3, 422.1, 455/456.1, 456.2, 522, 561, 574, 13.4, 117, 455/26.1, 405, 427, 92; 370/252, 315, 318, 370/332
See application file for complete search history.

(56) References Cited

U.S. PATENT DOCUMENTS

| 5,722,061 A | 2/1998 | Hutchison, IV et al. |
| 2002/0016153 A1 | 2/2002 | Sato et al. |

(Continued)

FOREIGN PATENT DOCUMENTS

| JP | 07-226710 A | 8/1995 |
| JP | 2000-022628 A | 1/2000 |

(Continued)

OTHER PUBLICATIONS

International Search Report for PCT/JP2011/074464.
(Continued)

*Primary Examiner* — Inder Mehra
(74) *Attorney, Agent, or Firm* — Bacon & Thomas, PLLC

(57) ABSTRACT

Provided is a wireless transmitter-receiver capable of suppressing undesirable power consumption and elongating the continuous operation time by operation of a user with the intention of controlling transmission power and also suitable to secure the "symmetry of communication".

The wireless transmitter-receiver decreases the upper limit value of transmission power by an operation of an operation means 114 and decreases the reception sensitivity in accordance with the decreased upper limit value of transmission power. Thereby, a user can determine the upper limit value of transmission power of the wireless transmitter-receiver and manage the transmission power to suppress power consumption and elongate a continuous operation time. Moreover, the wireless transmitter-receiver can eliminate the influence of radio frequency electromagnetic field on a human body. Furthermore, the degree of imbalance in the "symmetry of communication" can be minimized.

15 Claims, 17 Drawing Sheets

(51) Int. Cl.
*H04B 7/00* (2006.01)
*H04B 1/02* (2006.01)
*H04W 52/24* (2009.01)
*H04W 52/26* (2009.01)
*H04W 52/02* (2009.01)
*H04W 52/36* (2009.01)

(56) References Cited

U.S. PATENT DOCUMENTS

| | | | |
|---|---|---|---|
| 2005/0101360 | A1 | 5/2005 | Umemura et al. |
| 2006/0052069 | A1 | 3/2006 | Odagiri et al. |
| 2008/0108397 | A1* | 5/2008 | Piipponen et al. ............ 455/574 |
| 2009/0318182 | A1 | 12/2009 | Nagato et al. |
| 2010/0150561 | A1* | 6/2010 | Cho et al. ........................ 398/79 |
| 2010/0267413 | A1 | 10/2010 | Iizuka et al. |
| 2012/0289278 | A1* | 11/2012 | Huschke et al. ............. 455/522 |

FOREIGN PATENT DOCUMENTS

| | | |
|---|---|---|
| JP | 2000-341202 A | 12/2000 |
| JP | 2002-118577 A | 4/2002 |
| JP | 2003-218733 A | 7/2003 |
| JP | 2003-274457 A | 9/2003 |
| JP | 2004-15655 A | 1/2004 |
| JP | 2004-140655 A | 5/2004 |
| JP | 2005-20076 A | 1/2005 |
| JP | 2007-318767 A | 12/2007 |
| JP | 2008-113110 A | 5/2008 |
| JP | 2008-182413 A | 8/2008 |
| JP | 2009-246733 A | 10/2009 |
| JP | 2010-4187 A | 1/2010 |
| JP | 2010-239203 A | 10/2010 |
| JP | 2010-258524 A | 11/2010 |
| WO | 02-33837 A1 | 4/2002 |
| WO | 2007-138714 A1 | 12/2007 |

OTHER PUBLICATIONS

International Search Report for PCT/JP2012/061616.
International Search Report for PCT/JP2012/060758.
2010-238583 OA1—Notification of Reasons for Refusal.
2010-238583 OA2—Decision of Rejection mailed May 2, 2011.
2011-024997 OA3—Notification of Reasons for Refusal mailed May 31, 2011.
2011-024997 OA4—Decision of Rejection mailed on Sep. 28, 2011.
2011-024997 OA5—Notification of Reasons for Refusal mailed Nov. 10, 2011.
2011-553221 OA 6—Notification of Reasons for Refusal mailed Feb. 22, 2012.
2011-553221 OA 7—Notification of Reasons for Refusal mailed Jul. 19, 2012.
2011-553221 OA 8—Notification of Reasons for Refusal mailed Dec. 6, 2012.

* cited by examiner (a)

(b)

(a)

(b)

(a)

(b)

(a)

(b)

(a)

(b)

(a)

(b)

(a)

(b)

(c)

(a)

(b)

(c)

(a)

(b)

(c)

(a)

(b)

(c)

COMMUNICATION DEVICE

FIELD OF THE INVENTION

The present invention relates to a wireless transmitter-receiver and more specifically to controlling transmission power of a wireless transmitter-receiver.

BACKGROUND OF THE INVENTION

In recent years, wireless terminals such as a cellular phone using a battery as a power source and a mobile PC installed with a communication device widely spread to be used in a mobile communication system. In accordance with the trend, the effort to elongate the continuous operation time of these wireless terminals has been made by using various energy saving technologies.

Meanwhile, a wireless terminal consumes the most power in transmitting a signal in the total power consumption. The power required for transmission in a conventional wireless terminal is determined by the intensity or quality of the signal transmitted by a radio base station and received by the wireless terminal in a mobile communication system.

As an example of prior art, patent document 1 relates to a radio communication system, wherein transmission power is determined on the basis of measured intensity of a received signal.

Patent Document 1: JP 07-226710 A

SUMMARY OF THE INVENTION

Problem to be Solved by the Invention

The conventional wireless terminal, however, does not allow a user to control the transmission power with the intention. Therefore, a user cannot decrease the transmission power with the intention of saving energy consumption when the power is on. If a wireless terminal is in an environment to which a radio base station can hardly transmit a radio wave, the wireless terminal performs transmission with the maximum power. As a result, the wireless terminal consumes more power than that the user has expected, which is one of the reason why the continuous operation time is shortened.

The object of the present invention is to provide a wireless transmitter-receiver capable of controlling undesirable power consumption and elongating the continuous operation time by operation of a user with the intention of controlling transmission power, and the control means thereof.

A radio wave propagated by predetermined transmission power from a radio base station undergoes propagation loss on the path to a wireless terminal, and then is received by the wireless terminal.

The radio wave propagated by the wireless terminal undergoes the same amount of propagation loss as mentioned above on the path to the base station. As in this case, the amounts of propagation loss are equal between the transmission side and the reception side. Therefore, the communication is considered to be symmetrical in this meaning.

The maximum values of transmission power are different in general between a radio base station and a wireless terminal. Even in such a case, a system is designed taking account of the characteristics of antennas, noise figure of a receiver unit, etc. so that the "symmetry of communication" is sustained.

Here, if only the transmission power is decreased, the signal received by a radio base station is made weak and the "symmetry of communication" becomes incompatible. In this state, in order to sustain the "symmetry of communication" only on the wireless terminal side, the wireless terminal only needs to decrease reception sensitivity by an amount corresponding to the decreased amount of the transmission power by the wireless terminal.

The object of the present invention is to make transmission power to be changeable with the intention of the user while securing the "symmetry of communication".

Means for Solving the Problem

Invention 1

To achieve the objects, Invention 1 is a wireless transmitter-receiver characterized in comprising a transmission power controlling means and a reception sensitivity controlling means, the transmission power controlling means and the reception sensitivity controlling means being controlled by a single operation.

Here, controlling the transmission power controlling means and the reception sensitivity controlling means by a single operation means the operation performed when the power of a wireless transmitter-receiver is on, and does not include, for example, switching the power from on to off to make the upper limit value of transmission power and the reception sensitivity simultaneously to be zero.

Invention 2

Moreover, to achieve the objects, Invention 2 is a wireless transmitter-receiver characterized in being provided with a means for decreasing the upper limit value of transmission power by a prescribed operation and a means for decreasing reception performance in accordance with the upper limit value of transmission power decreased by the prescribed operation.

In such a configuration as mentioned above, which is provided with the means for decreasing the upper limit value of transmission power by a prescribed operation, thereby an effect such that the power consumption can be suppressed by managing the transmission power by the user and that the continuous operation time can be elongated is demonstrated. Furthermore, in such a configuration, which is provided with the means for decreasing the reception performance in accordance with the decreased upper limit value of transmission power, thereby an effect such that the degree of imbalance in the "symmetry of communication" can be minimized is demonstrated.

Invention 3

Moreover, Invention 3 is a wireless transmitter-receiver of Inventions 2 characterized in that the reception performance is reception sensitivity.

Invention 4

Moreover, Invention 4 is a wireless transmitter-receiver of Invention 2 characterized in that the reception performance is a reference value in determining if the communication is compatible.

Invention 5

Moreover, Invention 5 is a wireless transmitter-receiver of invention 2 characterized in that the reception performance is an allowance for an error rate of received data.

Invention 6

Moreover, to achieve the objects, Invention 6 is a wireless transmitter-receiver characterized in being provided with a means for decreasing an upper limit value of transmission power by a prescribed operation and a means for notifying a partner in communication of a reception state in the case when reception performance is decreased or assumed to be decreased in accordance with the upper limit value of transmission power decreased by a prescribed operation.

In such a configuration as mentioned above, which is provided with the means for decreasing the upper limit value of transmission power by a prescribed operation, thereby an effect such that the power consumption can be suppressed by managing the transmission power by the user and the continuous operation time can be elongated is demonstrated. Furthermore, in such a configuration, which is provided with the means for notifying a partner in communication of a reception state in the case when reception performance is decreased or assumed to be decreased in accordance with the upper limit value of transmission power decreased by a prescribed operation, for example, if the partner in communication can control the transmission power, etc. on the basis of the reception state of the wireless transmitter-receiver in the configuration, thereby an effect such that the degree of imbalance in the "symmetry of communication" can be minimized is demonstrated.

Invention 7

Moreover, Invention 7 is a wireless transmitter-receiver of Invention 6 characterized in that the reception performance is reception sensitivity.

Invention 8

Moreover, Invention 8 is a wireless transmitter-receiver of Invention 6 characterized in that the reception performance is a reference value in determining if the communication is compatible.

Invention 9

Moreover, Invention 9 is a wireless transmitter-receiver of Invention 6 characterized in that the reception performance is an allowance for an error rate of received data.

Invention 10

Moreover, Invention 10 is a wireless transmitter-receiver of either of Inventions 3 and 7 characterized by establishing communication to a partner in radio transmission and reception with higher radio wave intensity than the previously registered radio wave intensity while using the decreased reception sensitivity.

Invention 11

Moreover, Invention 11 is a wireless transmitter-receiver of Invention 10 characterized in being capable of decreasing and restoring to normal values simultaneously the upper limit value of transmission power and the reception sensitivity by a control signal generated by the prescribed operation by a user.

Invention 12

Moreover, Invention 12 is a wireless transmitter-receiver of Invention 10 characterized in being capable of decreasing and restoring to normal values simultaneously the upper limit value of transmission power and the reception sensitivity by a control signal generated by a remote operation caused by the information transmitted from the outside.

Invention 13

Moreover, invention 13 is a wireless transmitter-receiver of Invention 10 characterized in that when a call to a previously registered partner in the information transmission is made in a state in which the upper limit value of transmitting power and the reception sensitivity have been decreased, the upper limit value of transmitting power that has been decreased returns to a normal value.

Invention 14

Moreover, Invention 14 is a wireless transmitter-receiver of Invention 10 characterized in that when a call from a previously registered partner in an information transmission is received in a state in which the upper limit value of transmitting power and the reception sensitivity have been decreased, the upper limit value of transmitting power that has been decreased returns to a normal value.

Invention 15

Moreover, Invention 15 is a wireless transmitter-receiver of Invention 10 characterized in that when a previously registered specific event is detected in a state in which the upper limit value of transmitting power and the reception sensitivity have been decreased, the upper limit value of transmitting power that has been decreased returns to a normal value.

Here, the specific event means a state that allows the decreased upper limit value of transmitting power to return to a normal value without an operation of a user.

The wireless transmitter-receiver of Invention 15 is characterized in that the upper limit value of transmitting power that has been decreased returns to a normal value when, for example, being connected with wired earphones, being connected with a wired microphone, being connected with wireless earphones, being connected with a wireless microphone, being located in a previously registered area, and/or it is in the period of time previously registered.

Invention 16

Moreover, to achieve the objects, invention 16 is a wireless transmitter-receiver comprising a transmitting power controlling means and a reception sensitivity controlling means, wherein: the transmitting power controlling means and the reception sensitivity controlling means have a common control signal; the wireless transmitter-receiver is capable of decreasing and restoring to normal values simultaneously the upper limit value of transmission power and the reception sensitivity by operating the control signal; the wireless transmitter-receiver is capable of establishing communication to a partner in radio transmission and reception with higher radio wave intensity than the previously registered radio wave intensity while using the decreased reception sensitivity; and the wireless transmitter-receiver comprises a location detecting means and is capable of decreasing and restoring to normal values the upper limit value of transmission power when detecting being located in a previously registered area.

Invention 17

Moreover, Invention 17 is a wireless transmitter-receiver of Invention 16 characterized in controlling reception sensitivity in conjunction with transmission output power.

Invention 17

Moreover, Invention 18 is a wireless transmitter-receiver of Invention 16 characterized in that reception sensitivity changes in conjunction with transmission output power.

Effect of the Invention

According to the present invention, a user can determine the upper limit value of transmission power of a wireless transmitter-receiver and manage the transmission power to suppress power consumption and to elongate a continuous operation time. Moreover, the wireless transmitter-receiver can eliminate an influence of radio frequency electromagnetic field on a human body.

BEST MODES FOR CARRYING OUT THE INVENTION

Exemplary embodiments of the present invention are described. Herein, relationships between mobile communication systems and embodiments of the present invention are described.

A configuration of a mobile communication system connected with cellular phones, mobile PCs installed with communication devices, etc. comprises at least wireless terminals, a "radio base station, which is a partner in radio transmission and reception" (hereinafter, referred to as a "radio base station"), a public communication network, and a "terminal to be a partner in an information transmission".

In the mobile communication system when the wireless terminal from this side intends to establish a communication with a "terminal to be a partner in an information transmission and reception", the wireless terminal on this side is connected with the "radio base station", and through the public communication network connected with the "terminal to be a partner in an information transmission".

The present invention can be widely applied not only to a wireless terminal and a radio base station in a mobile communication system but also to one-to-one radio communication, etc. The following wireless transmitter-receivers according to first to fifth embodiments of the present invention, however, are described as the examples of the present invention applied to wireless terminals in a mobile communication system.

In the embodiments of the present application the states of transmission power and reception sensitivity represented by "normal" and "lower than normal" are defined as follows.

The transmission power of a wireless transmitter-receiver in a conventional mobile communication system could not be changed to an intended value by a user with the intention of doing so. The transmission power was determined by the base station and the wireless terminal on the basis of the results of the measured intensity of the radio wave propagated from the base station.

Figure 1:
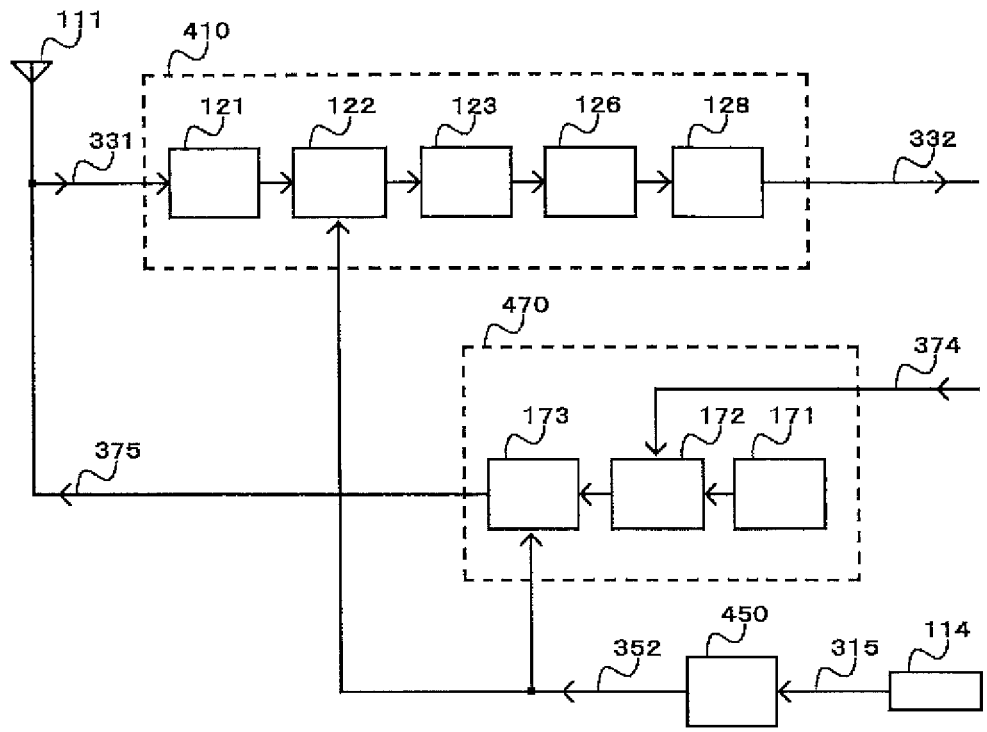
FIG. 1 shows a basic configuration of a wireless transmitter-receiver according to a first embodiment of the present invention.

In the embodiments according to the present invention the transmission power not changed by a user is defined as "normal transmission power", while the transmission power decreased by a user with the intention to do so is defined as "decreased transmission power below normal", First Embodiment A wireless transmitter-receiver according to a first embodiment of the present invention is explained. FIG. 1 shows a basic configuration of a wireless transmitter-receiver according to a first embodiment.

A configuration of the wireless transmitter-receiver and actions of respective parts are explained. The wireless transmitter-receiver is constituted by an antenna 111, a receiving unit 410, a transmitting unit 470, a control-signal generation unit 450, and an operation means 114.

The receiving unit 410 comprises at least a bandwidth limiter 121, a sensitivity controller 122, an automatic gain control amplifier 123, a channel tuner 126, and a demodulator 128.

A received signal 331 caught by the antenna 111 is inputted to the receiving unit 410 and a demodulated signal 332 is outputted from the receiving unit 410. The demodulated signal 332 includes the "information transmitted by a base station".

The sensitivity controller 122 can change reception sensitivity by a correction control signal 352 generated by a control signal generator 450.

Figure 11:
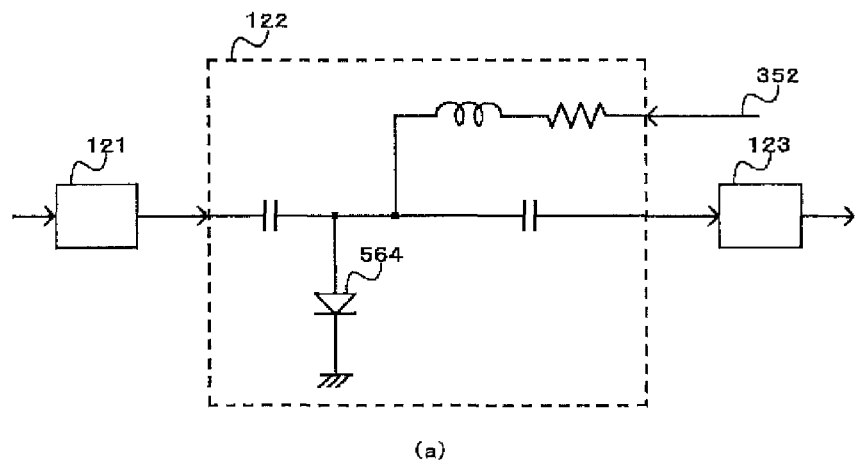
FIG. 11 is a circuit example of a sensitivity controller.
Figure 11:
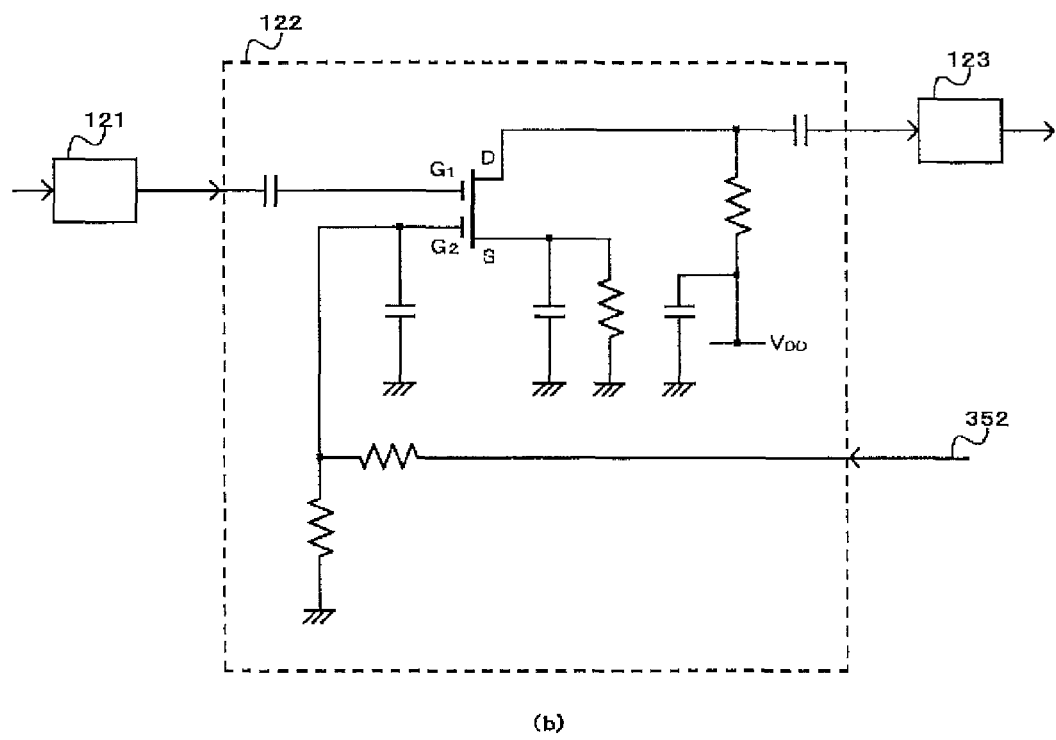

FIG. 11 shows a circuit example of the sensitivity controller 122. The sensitivity controller 122 may have a configuration as indicated in FIG. 11(a), for example, comprising: a first capacitor the one end of which is connected with the bandwidth limiter 121; a PIN diode 564 the anode terminal of which is connected with the other end of the first capacitor and the cathode terminal of which is grounded; a resistance element the one end of which is inputted with the correction control signal 352; a coil the one end of which is connected with the other end of the resistance element and the other end of which is connected with an anode terminal of the PIN diode 564; and a second capacitor the one end of which is connected with the anode terminal of the PIN diode 564 and the other end of which is connected with the automatic gain control amplifier 123.

The sensitivity controller 122 may have another configuration as indicated in FIG. 11(b), for example, comprising: a first capacitor the one end of which is connected with the bandwidth limiter 121; a second capacitor the one end of which is grounded; a first resistance element the one end of which is grounded; a second resistance element the one end of which is inputted with the correction control signal 352; a dual gate field-effect transistor the first gate terminal G1 of which is connected with the other end of the first capacitor, and the second gate terminal G2 of which is connected with the second capacitor, the other end of the first resistance element, and the other end of the second resistance element; a third capacitor the one end of which is connected with a source terminal S of the dual gate field-effect transistor and the other end of which is grounded; a third resistance element the one end of which is connected with the source terminal S of the dual gate field-effect transistor and the other end of which is grounded; a fourth resistance element the one end of which is connected with a drain terminal D of the dual gate field-effect transistor and the other end of which is connected with a power source VDD; a fourth capacitor the one end of which is connected with the power source VDD and the other end of which is grounded; and a fifth capacitor the one end of which is connected with the drain terminal D of the dual gate field-effect transistor and the other end of which is connected with the automatic gain control amplifier 123.

The transmitting unit 470 comprises at least a carrier wave generator 171, a demodulator 172, and a transmission power controller 173.

A modulating signal 374 having "information to be transmitted to a partner" is inputted to the transmitting unit 470. The transmitting unit 470 generates a transmission signal 375 and outputs the transmission signal 375 to an antenna 111.

The transmission power controller 173 can change transmission power in accordance with the correction control signal 352 generated by the control signal generator 450.

Figure 12:
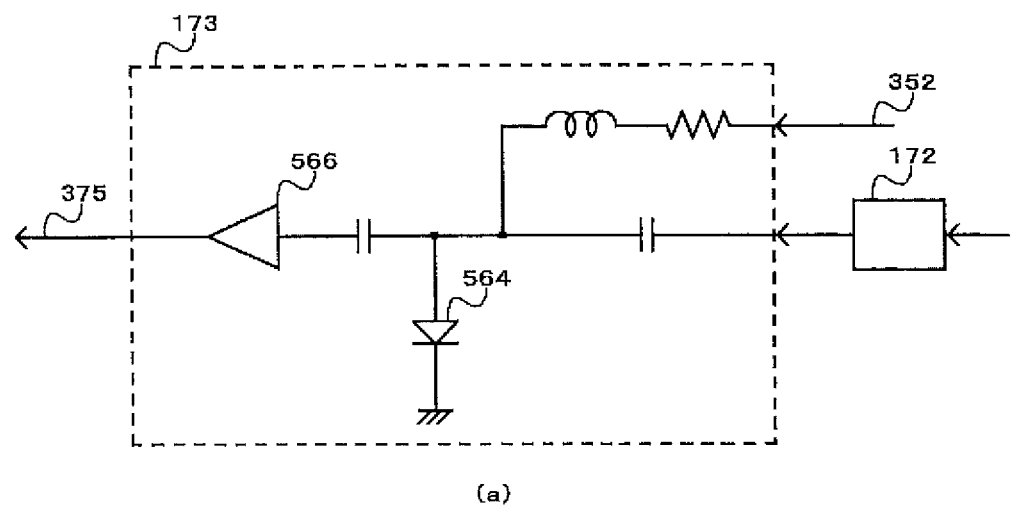
FIG. 12 is a circuit example of a transmission power controller.
Figure 12:
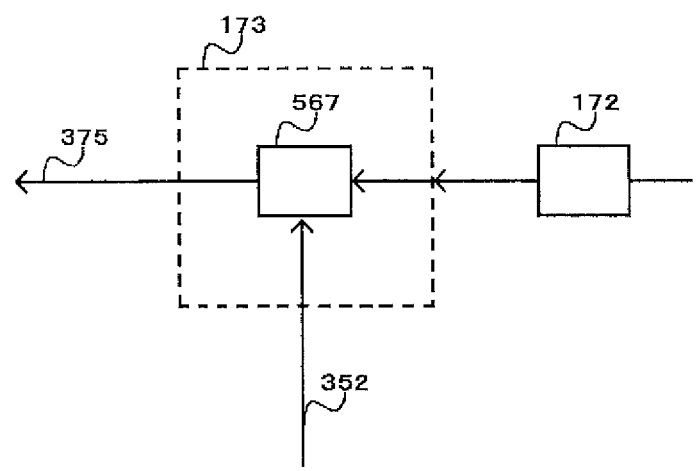

FIG. 12 shows a circuit example of the transmission power controller 173. The transmission power controller 173 may have a configuration as indicated in FIG. 12(a), for example, comprising: a first capacitor the one end of which is connected with a modulator 172; a PIN diode 564 the anode terminal of which is connected with the other end of the first capacitor and the cathode terminal of which is grounded; a resistance element the one end of which is inputted with the correction control signal 352; a coil the one end of which is connected with the other end of the resistance element and the other end of which is connected with an anode terminal of the PIN diode 564; a second capacitor the one end of which is connected with the anode terminal of the PIN diode 564; and a power amplifier 566 the input terminal of which is connected with the other end of the second capacitor and the output terminal of which outputs a transmission signal 375.

The transmission power controller 173 may have another configuration as indicated in FIG. 12(b), for example, comprising a gain-changeable power amplifier 567 which is inputted with the signal outputted by the modulator 172 and the correction control signal 352 to an input terminal and outputs an transmission signal 375 from an output terminal.

An operation means 114 generates an operation signal 315 on the basis of the operation made by a user, etc. and outputs the operation signal 315 to the control signal generator 450.

The control signal generator 450 is inputted with the operation signal 315 from the operation means 114 and outputs the correction control signal 352 determined on the basis of the state of the operation signal 315. The control signal generator 450 generates and outputs the correction control signal 352 to the transmitting unit 470 and the receiving unit 410 in common.

In other word, the transmitting unit 470 and the receiving unit 410 are controlled by a single operation made by the operation means 114.

Figure 13:
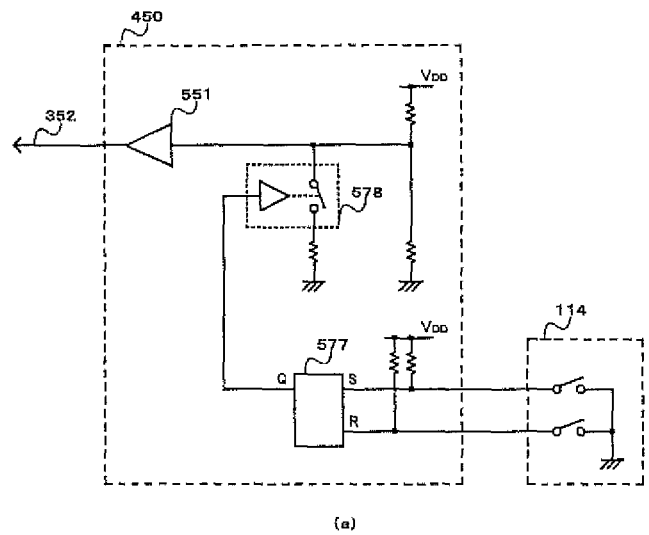
FIG. 13 is a circuit example of a control signal generator.
Figure 13:
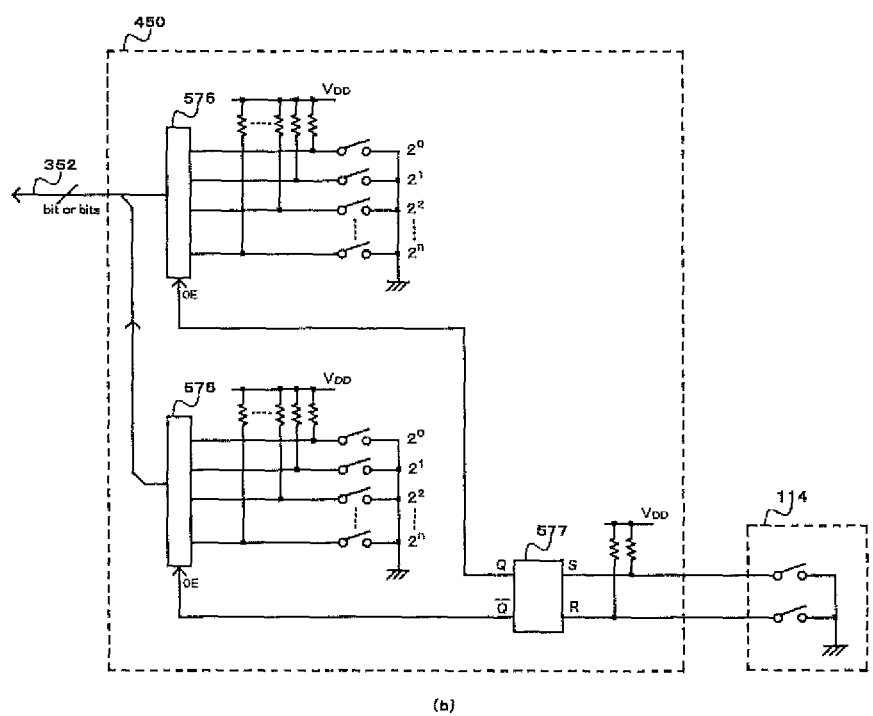

FIG. 13 shows a circuit example of the control signal generator 450. The control signal generator 450 may have a configuration as indicated in FIG. 13(a), for example, comprising: a first resistance element the one end of which is connected with a power source VDD; a second resistance element the one end of which is connected with the power source VDD; a flip-flop 577 the set terminal S of which is connected with the other end of the first resistance element and the reset terminal R of which is connected with the other end of the second resistance element; an analog switch the control terminal of which is connected with an output terminal Q of the flip-flop 577; a third resistance element the one end of which is connected with the power source VDD and the other end of which is connected with the one end of the analog switch 578; a fourth resistance element the one end of which is connected with the one end of the analog switch 578 and the other end of which is grounded; a fifth resistance element the one end of which is connected with the other end of the analog switch 578 and the other end of which is grounded; and a voltage-follower amplifier 551 the input terminal of which is connected with the one end of the analog switch 578 and the output terminal of which outputs a correction control signal 352.

The control signal generator 450 may have another configuration as indicated in FIG. 13 (*b*), for example, comprising: a first resistance the one end of which is connected with a power source VDD; a second resistance the one end of which is connected with a power source VDD; a flip-flop 577 the set terminal S of which is connected with the other end of the first resistance element and the reset terminal R of which is connected with the other end of the second resistance element; a first three-state buffer 576 the output enable terminal OE of which is connected with the output terminal Q of the flip-flop 577 and the output terminal of which outputs a correction control signal 352; n+1 first switch elements the one ends of which are respectively connected with the n+1 input terminals of the first three-state buffer 576 and the other ends of which are grounded; n+1 third resistance elements the one ends of which are connected with the power source VDD and the other ends of which are respectively connected with the n+1 input terminals of the first three-state buffer 576; a second three-state buffer 576 the output enable terminal OE of which is connected with the inverted output terminal ⁻Q of the flip-flop 577 and the output terminal of which outputs a correction control signal 352; n+1 second switch elements the one ends of which are respectively connected with the n+1 input terminals of the second three-state buffer 576 and the other ends of which are grounded; and; n+1 fourth resistance elements the one ends of which are connected with the power source VDD and the other ends of which are respectively connected with the n+1 input terminals of the second three-state buffer 576.

FIGS. 13(*a*) and 13(*b*) show the examples of the operation means 114 having a configuration which comprises a first switch element the one end of which is connected with the set terminal S of the flip-flop 577 and the other end of which is grounded and a second switch element the one end of which is connected with the reset terminal R of the flip-flop 577 and the other end of which is grounded.

The action of the wireless transmitter-receiver in the case when the transmission power of the wireless transmitter-receiver is "normal transmission power" is described below.

Note that the action of the wireless transmitter-receiver in the case when the transmission power is the "normal transmission power" is identical to the action of a conventional wireless terminal.

When the transmission power of the wireless transmitter-receiver is "normal transmission power" the control signal generator 450 generates the correction control signal 352 having the value for sustaining the "normal transmission power" and the "normal reception sensitivity" and outputs the correction control signal 352 to the transmitting unit 470 and the receiving unit 410.

The transmission power controller 173 which is a component of the transmitting unit 470 is inputted with the correction control signal 352 having the value for sustaining the "normal transmission power". The transmitting unit 470 therefore outputs the transmission signal 375 with the "normal transmission power".

The sensitivity controller 122 which is a component of the receiving unit 410 is inputted with the correction control signal 352 having the value for sustaining the "normal reception sensitivity". The receiving unit 410 therefore generates the demodulated signal 332 with the "normal reception sensitivity".

Here, a problem caused when the transmission power is decreased is described. A wireless transmitter-receiver determines the transmission power in accordance with the intensity of the radio wave propagated from a wireless base station.

If the radio wave propagated from the radio base station is strong enough the wireless transmitter-receiver decreases the transmission power. Meanwhile, if the radio wave propagated from the radio base station is weak the wireless transmitter-receiver increases the transmission power.

A wireless transmitter-receiver performs transmission with the minimum necessary transmission power in the normal state. In the state in which a wireless transmitter-receiver can receive the radio wave propagated from a radio base station, for example, if the wireless transmitter-receiver simply decreases the transmission power, the radio wave from the wireless transmitter-receiver cannot be propagated to the radio base station and the communication is stopped. Moreover, the "symmetry of communication" between the transmission power and reception sensitivity of the wireless transmitter-receiver becomes imbalanced if seen from the radio base station, Consequently, the radio base station and the base station network cannot operate normal communication with the wireless transmitter-receiver.

The problem mentioned above and the means for solving the problem are more concretely described in comparison with conventional means.

Figure 21:
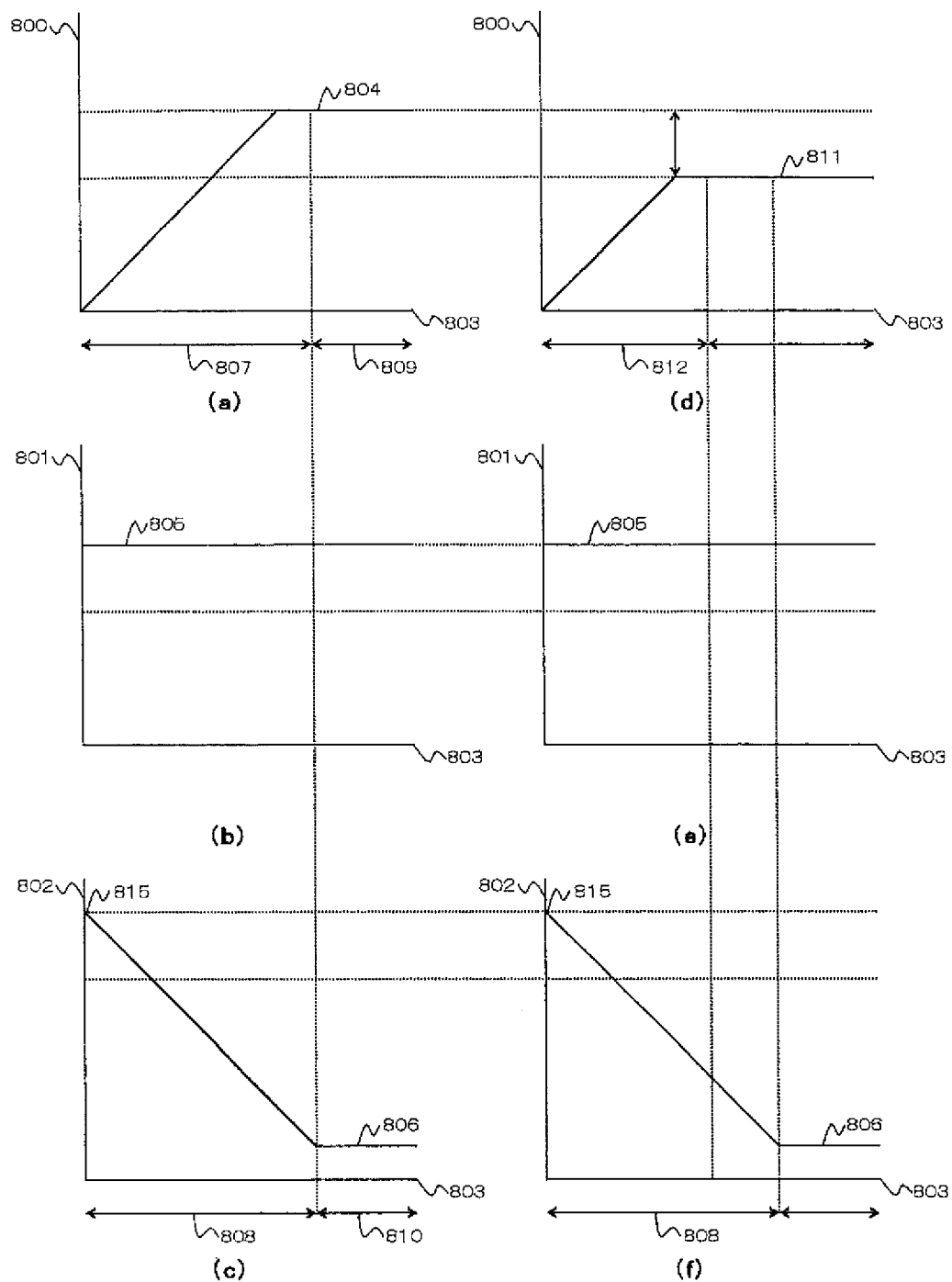
FIG. 21 shows transmission power characteristics, reception sensitivity characteristics, and reception intensity characteristics of a conventional wireless transmitter-receiver respectively in (a)-(c), and transmission power characteristics, reception sensitivity characteristics, and reception intensity characteristics of a conventional wireless transmitter-receiver respectively in (d)-(f) in the case when only the upper limit value of transmission power is decreased.

FIG. 21(*a*)-(*c*) are charts respectively showing transmission power characteristics, reception sensitivity characteristics, and reception intensity characteristics of a conventional wireless terminal, and FIG. 21(*d*)-(*f*) are charts respectively showing transmission power characteristics, reception sensitivity characteristics, and reception intensity characteristics of a conventional wireless terminal in the case when only the upper limit value of transmission power is decreased.

Figure 22:
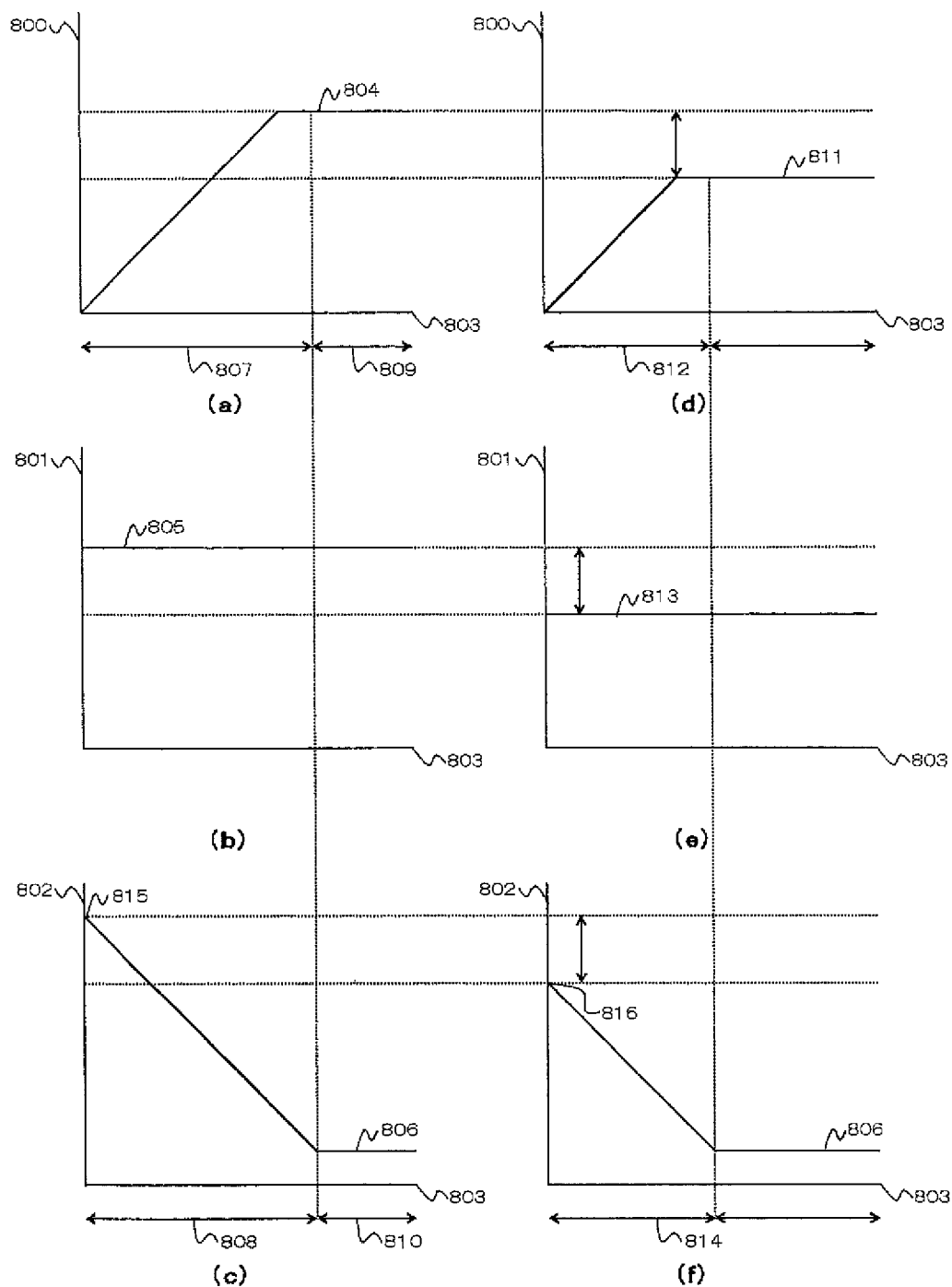
FIG. 22 shows transmission power characteristics, reception sensitivity characteristics, and reception intensity characteristics of a conventional wireless transmitter-receiver respectively in (a)-(c), and transmission power characteristics, reception sensitivity characteristics, and reception intensity characteristics of a conventional wireless transmitter-receiver respectively in (d)-(f) of the wireless transmitter-receiver according to the first embodiment of the present invention.

FIG. 22(*a*)-(*c*) are charts respectively showing transmission power characteristics, reception sensitivity characteristics, and reception intensity characteristics of a conventional wireless terminal, and FIG. 22(*d*)-(*f*) are charts respectively showing transmission power characteristics, reception sensitivity characteristics, and reception intensity characteristics of a wireless transmitter-receiver according to the present embodiment.

The vertical axes 800 in FIGS. 21(*a*) and (*d*) and FIGS. 22(*a*) and (*d*) represent transmission power, the vertical axes 801 in FIGS. 21(*b*) and (*e*) and FIGS. 22(*b*) and (*e*) represent reception sensitivity, and the vertical axes 802 in FIGS. 21(*c*) and (*f*) and FIGS. 22(*c*) and (*f*) represent reception intensity. The horizontal axes 803 in FIG. 21 and FIG. 22 represent the propagation loss (≈distance) between a conventional wireless terminal (or a wireless transmitter-receiver according to the present embodiment) and a radio base station.

A conventional wireless terminal controls transmission power in such a manner that as the propagation loss on the way to/from a radio base station increases (that is, as the radio wave propagated from the radio base station becomes weaker) the transmission power increases as shown in FIG. 21(*a*). The transmission power becomes constant at the maximum transmission power 804 that the wireless terminal can exert, and when the propagation loss becomes a little higher than the value at the maximum transmission power 804 the wireless terminal cannot transmit a signal to the radio base station anymore. Meanwhile, the reception sensitivity is set, regardless of the propagation loss, to be the maximum reception sensitivity 805 that the wireless terminal can exert as shown in FIG. 21(*b*). Therefore, as the propagation loss becomes higher the reception intensity decreases from the maximum reception intensity 815 as shown in FIG. 21(*c*), and when the reception intensity decreases to the allowance 806 the wireless terminal cannot receive a signal from the radio base station anymore.

In the state mentioned above, the range 807 where the wireless terminal can transmit a signal to the radio base station and the range 808 where the wireless terminal can receive a signal from the radio base station are identical, and therefore the "symmetry of communication" is compatible. That is because the system is designed so that the "symmetry of communication" is sustained taking account of the characteristics of antennas, noise figure of a receiver unit, etc. Therefore, when the propagation loss (a distance or an area) increases beyond the range 807 and 808 to the range 809 and 810, the wireless terminal cannot establish the communication with the radio base station anymore and displays "out of range".

Meanwhile, in the case when only the upper limit value of transmission power is decreased to a fixed value 811, the transmission power becomes constant at the fixed value 811 as shown in FIG. 21(d). When the propagation loss becomes a little higher than the value which corresponds to the fixed value 811, the wireless terminal cannot transmit a signal to the radio base station anymore. Therefore, the range 812 of the propagation loss (a distance or an area) where the wireless terminal can transmit a signal to the radio base station becomes narrower than that in the case when the upper limit value of transmission power is not decreased. The reception sensitivity, however, is set, regardless of the propagation loss, to be the maximum reception sensitivity 805 as shown in FIG. 21(e). Therefore, as the propagation loss becomes higher the reception intensity decreases from the maximum reception intensity 815 as shown in FIG. 21(f), and when the reception intensity decreases to the allowance 806 the wireless terminal cannot receive a signal from the radio base station anymore. Consequently, the range 808 where the wireless terminal can receive a signal from the radio base station becomes identical to the range in the case when the upper limit value of transmission power is not decreased.

In the state mentioned above, the range 812 of the propagation loss where the wireless terminal can transmit a signal to the radio base station and the range 808 of the propagation loss where the wireless terminal can receive a signal from the radio base station are not identical, and therefore the "symmetry of communication" is incompatible. Namely, in the case when the propagation loss exceeds the range 812 and does not exceed the range 808, the wireless terminal cannot transmit a signal to the radio base station and, however, can receive a signal from the radio base station. In this one-way communication, the wireless terminal cannot make a call to the radio base station whereas the wireless terminal does not display "out of range". In this state the user is made confused, and in addition, the radio base station and the base station network cannot operate normal communication with the wireless transmitter-receiver.

To solve the problem mentioned above, in the case when the upper limit value of transmission power is decreased to a fixed value 811 by the operation of an operation means 114 as shown in FIG. 22(d) the wireless transmitter-receiver according to the present embodiment decreases the reception sensitivity to a fixed value 813 in accordance with the decreased upper limit value of transmission power 811 as shown in FIG. 22(e), In the case, for example, when the upper limit value of transmission power is decreased from the maximum transmission power 804 (for example, 1 [W]) to a constant value 811 (for example, 0.1 [W]) the wireless transmitter-receiver decreases the reception sensitivity from the maximum reception sensitivity 805 (for example, 0 [dB]) to a fixed value 813 (for example, −10 [dB]). When the reception sensitivity is decreased, as the propagation loss becomes higher the reception intensity also decreases from a constant value 816 which is the value decreased from the maximum reception intensity 815 by a prescribed value (corresponding to the difference between the maximum reception sensitivity 805 and the fixed value 813) as shown in FIG. 22(e). Furthermore, when the reception intensity decreases to the allowance 806 the wireless terminal cannot receive a signal from the radio base station anymore. Thus, the range of the reception intensity becomes narrower, and therefore the range 814 where the wireless transmitter-receiver can receive a signal from the radio base station becomes narrower than that in the case when reception sensitivity is not decreased.

Thereby the range 812 of the propagation loss where the wireless transmitter-receiver can transmit a signal to the radio base station and the range 814 of the propagation loss where the wireless terminal can receive a signal from the radio base station become identical, and therefore the "symmetry of communication" is sustained compatible.

The reception sensitivity may be decreased in accordance with the upper limit value of transmission power. In this case it is preferable to decrease the reception sensitivity in such a manner that the range (reception range) where the wireless transmitter-receiver can receive a signal from the radio base station and the range (transmission range) where the wireless terminal can transmit a signal to the radio base station become identical. However, the reception range and the transmission range do not have to be completely identical. If only the portion in which the reception range and the transmission range do not coincide is minimized in comparison with the case when the reception sensitivity is not decreased at all, the degree of imbalance in the "symmetry of communication" can be minimized. Therefore, when the upper limit value of transmission power is decreased, the reception sensitivity only has to be decreased so that the reception range and the transmission range coincide or the portion in which the both ranges do not coincide is minimized.

Next, the action of the wireless transmitter-receiver according to the present embodiment in the case when the transmission power is switched to the "decreased transmission power below normal" and the action for inhibiting the problem mentioned above are described in the example using a variable attenuator as the sensitivity controller 122 shown in FIG. 1.

Here, suppose that a user is decreasing the transmission power which is fluctuating within a prescribed range to 1/10 by manual operation as a usual operation.

When the user operates an operation means 114, a correction control signal 352 generated by a control signal generator 450 is inputted to the sensitivity controller 122 (variable attenuator) and a transmission power controller 173.

Here, the correction control signal 352 has a value indicating decrease to 1/10. The transmission power controller 173 sets the transmission power to be 1/10 of the original maximum transmission power.

The sensitivity controller 122 (variable attenuator) sets an attenuation factor to be 1/10. Accordingly, the wireless transmitter-receiver according to the present embodiment is capable of switching the transmission power to the "decreased transmission power below normal" and restoring to the "normal transmission power" and also capable of switching the reception sensitivity to the "decreased reception sensitivity below normal" and restoring to the "normal reception sensitivity" in conjunction with switching the transmission power.

A method for decreasing the reception sensitivity of the receiving unit 410 is described below. The sensitivity controller 122 which is a component of the receiving unit 410 can be implemented by using a variable amplifier and a variable attenuator.

As the other method, narrowing the gain variable range of an automatic gain control amplifier 123 is capable of decreasing the reception sensitivity of the receiving unit 410.

In such a way as in the present embodiment the wireless transmitter-receiver decreases the upper limit value of transmission power by the operation of the operation means 114 and decreases the reception sensitivity in accordance with the decreased upper limit value of transmission power.

Thereby, a user can determine the upper limit value of transmission power of the wireless transmitter-receiver and manage the transmission power to suppress power consumption and to elongate a continuous operation time. Moreover, the wireless transmitter-receiver can eliminate the influence of radio frequency electromagnetic field on a human body. Furthermore, the degree of imbalance in the "symmetry of communication" can be minimized.

Second Embodiment

Figure 2:
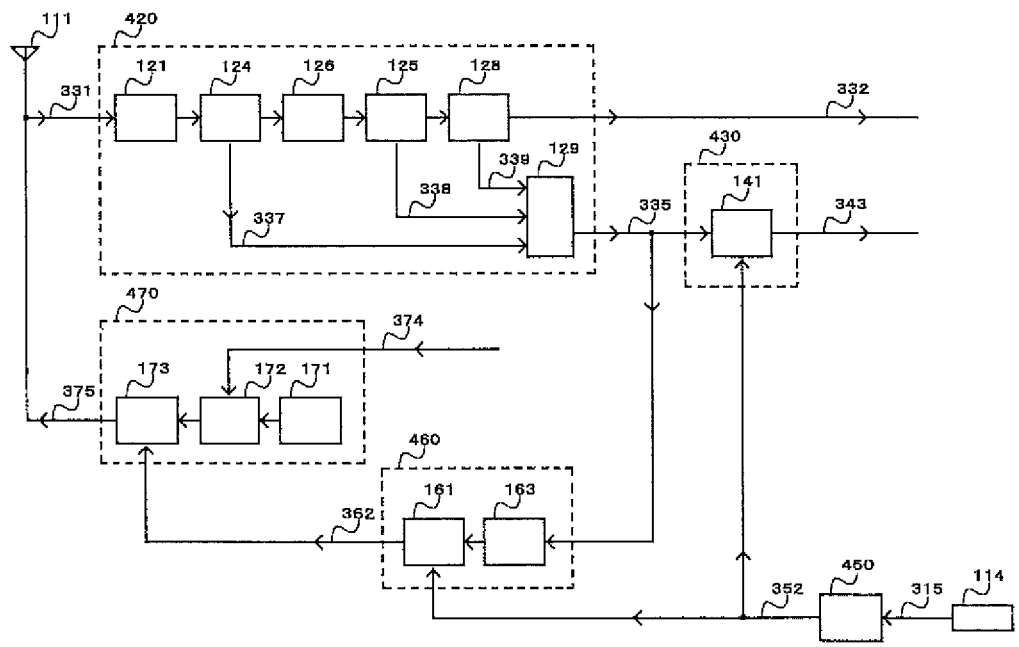
FIG. 2 shows a basic configuration of a wireless transmitter-receiver according to a second embodiment of the present invention.

A wireless transmitter-receiver according to a second embodiment of the present invention is explained. FIG. 2 shows a basic configuration of a wireless transmitter-receiver according to a second embodiment.

A configuration of the wireless transmitter-receiver and actions of respective parts are explained. The wireless transmitter-receiver is constituted by an antenna 111, a receiving unit 420, a determination unit for communication compatibility 430, a determination unit for transmission power 460, a transmitting unit 470, a control-signal generation unit 450, and an operation means 114.

The receiving unit 420 comprises at least a bandwidth limiter 121, an automatic gain control amplifier A 124, an automatic gain control amplifier B 125, a channel tuner 126, a demodulator 128, and a reception level generator 129.

A received signal 331 caught by the antenna 111 is inputted to the receiving unit 420 and a demodulated signal 332 is outputted from the receiving unit 420. The demodulated signal 332 includes the "information transmitted by a base station".

The reception level generator 129 converts the intensity or quality of the received signal 331 inputted to the receiving unit 420 to a reception level signal 335, and outputs the reception level signal 335 simultaneously to the determination unit for communication compatibility 430 and a determination unit for transmission power 460.

Incidentally, the automatic gain control amplifier A 124 and the automatic gain control amplifier B 125 are not always necessary. At least one automatic gain control amplifier is necessary to implement the embodiment.

The determination unit for communication compatibility 430 comprises at least a level comparator 141. The reception level signal 335 from the receiving unit 420 and a correction control signal 352 from a control signal generator 450 are inputted to the determination unit for communication compatibility 430.

The determination unit for communication compatibility 430 compares the value of the reception level signal 335 with the value of the correction control signal 352, and determines the state of a determination signal for communication compatibility 343.

The determination signal for communication compatibility 343 is outputted in either state of "communication is compatible" or "communication is incompatible".

Figure 15:
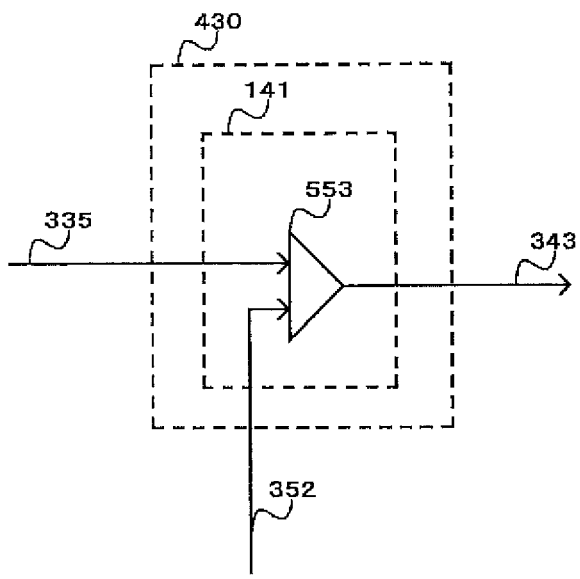
FIG. 15 is a circuit example of a determination unit for communication compatibility.
Figure 15:
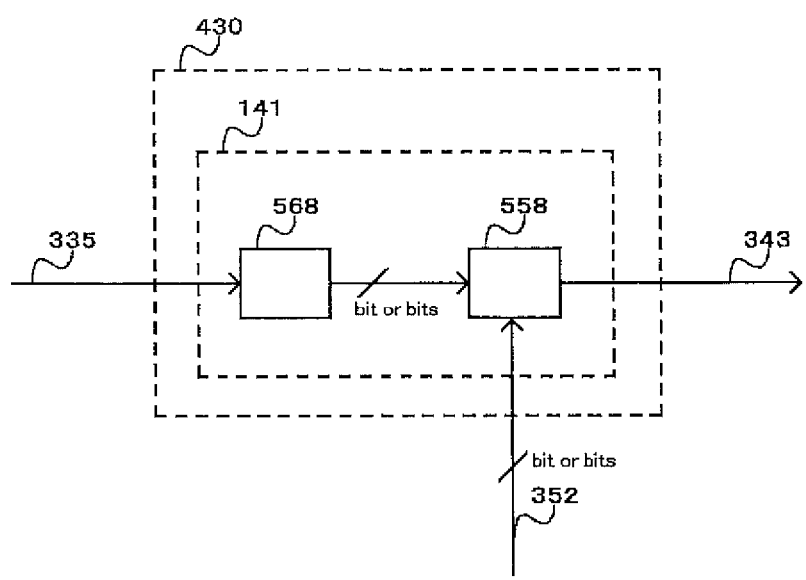

FIG. 15 shows a circuit example of the determination unit for communication compatibility 430. The determination unit for communication compatibility 430 may have a configuration as indicated in FIG. 15(a), for example, comprising a level comparator 141. The level comparator 141 has a configuration comprising a comparator 553 built by means of an analog circuit. The comparator 553 is inputted with the reception level signal 335 to a non-inverting input terminal and with the correction control signal 352 to an inverting-input terminal, and outputs the determination signal for communication compatibility 343 from an output terminal.

The determination unit for communication compatibility 430 may have another configuration as indicated in FIG. 15(b), for example, comprising a level comparator 141. The level comparator 141 has a configuration comprising an A/D converter 568 for being inputted with and analog-to-digital converting the reception level signal 335 and a weighted comparator 558 built by means of a logic circuit. The comparator 558 is inputted with the analog-to-digital converted reception level signal 335 to a first input terminal and with the correction control signal 352 (a digital signal) to a second terminal, and outputs the determination signal for communication compatibility 343 from an output terminal.

The determination unit for transmission power 460 comprises at least a level arithmetic unit 163 and a level limiter 161.

The reception level signal 335 from the receiving unit 420 and the correction control signal 352 from a control signal generator 450 are inputted to the determination unit for transmission power 460.

The level arithmetic unit 163 in the determination unit for transmission power 460 determines the transmission power from the value of the reception level signal 335.

The level limiter 161 verifies whether the transmission power determined by the level arithmetic unit 163 does not exceed the upper limit value based on the value of the correction control signal 352. If the transmission power exceeds the upper limit value, the level limiter 161 changes the transmission power to the upper limit value and outputs the result as a transmission power control signal 362 to the transmitting unit 470.

Namely, the upper limit value is restricted in accordance with the value of the correction control signal 352. Therefore, the transmission power control signal 362 within the restricted upper limit value is outputted so that the transmission power is suppressed below an intended value.

Figure 16:
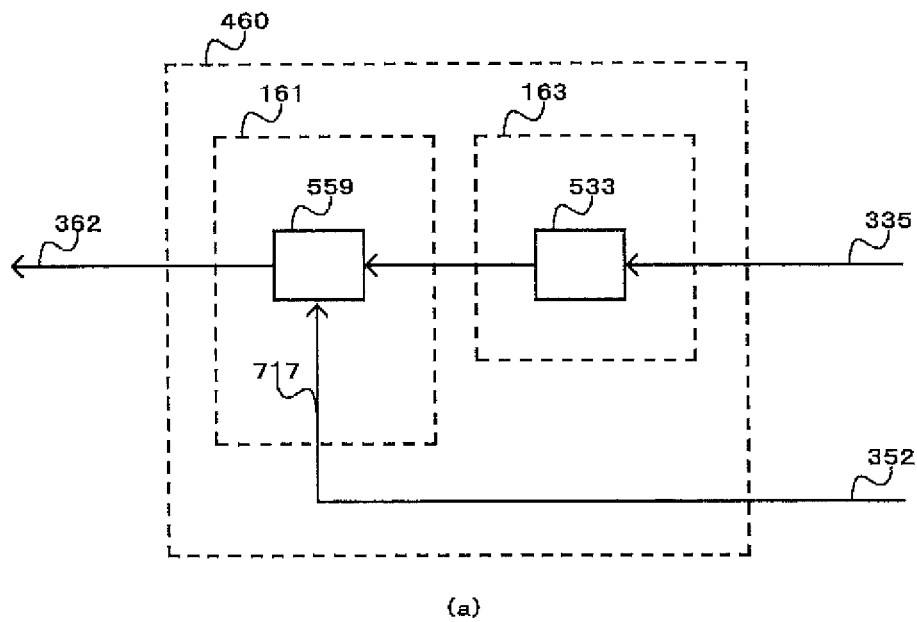
FIG. 16 is a circuit example of a determination unit for transmission power using a level limiter.
Figure 16:
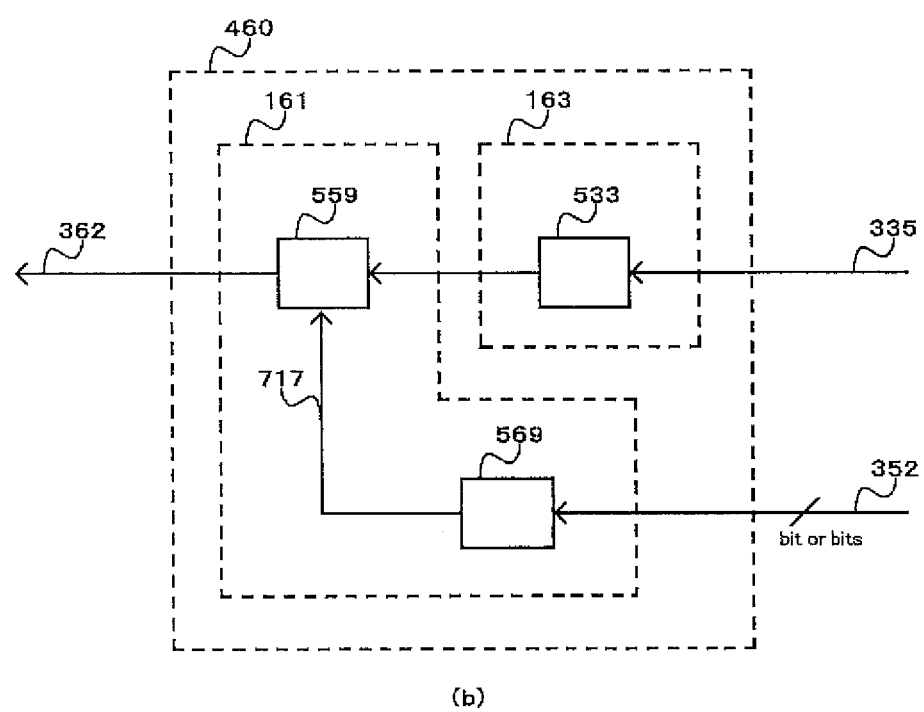
Figure 17:
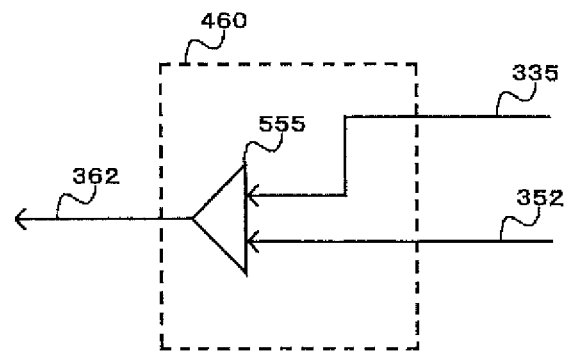
FIG. 17 is a circuit example of a determination unit for transmission power using a subtractor.
Figure 17:
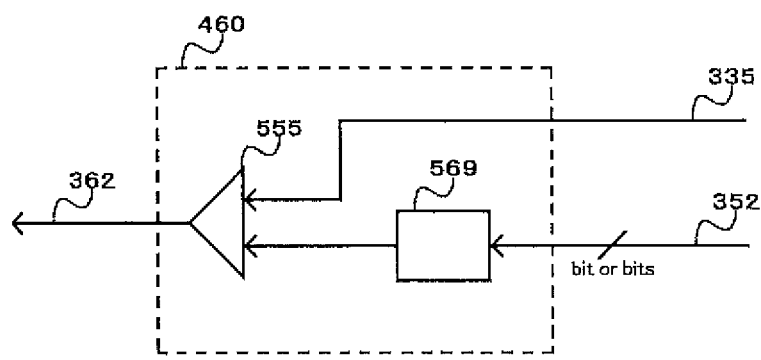
Figure 17:
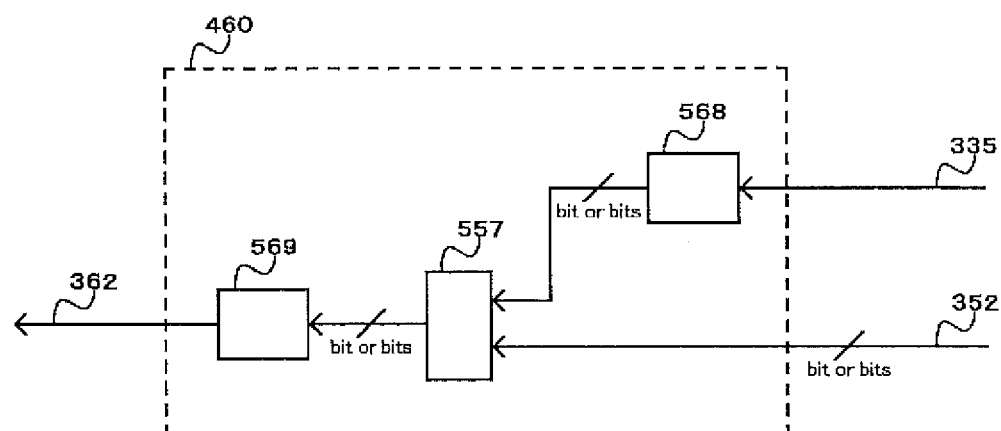

FIG. 16 and FIG. 17 show a circuit examples of the determination unit for transmission power 460. The determination unit for transmission power 460 may have a configuration as indicated in FIG. 16(a), for example, comprising a level limiter 161 and a level arithmetic unit 163. The level arithmetic unit 163 has a configuration comprising an inverting amplifier 533 built by means of an analog circuit. The inverting amplifier 533 is inputted with, amplifies and outputs the reception level signal 335. The level limiter 161 has a configuration comprising a level limiter 559 built by means of an analog circuit. The level limiter 559 is inputted with the amplified reception level signal 335 to an input terminal and with the correction control signal 352 as a level restriction reference voltage 717, and outputs the transmission power control signal 362 from an output terminal.

The determination unit for transmission power 460 may have another configuration as indicated in FIG. 16(b), for example, comprising a level limiter 161 and a level arithmetic unit 163. The level arithmetic unit 163 has a configuration comprising an inverting amplifier 533 built by means of an analog circuit. The inverting amplifier 533 is inputted with, amplifies and outputs the reception level signal 335. The level limiter 161 has a configuration comprising a D/A converter 569 for being inputted with and digital-to-analog converting the correction control signal 352 (a digital signal) and a level limiter 559 built by means of an analog circuit. The level limiter 559 is inputted with the amplified reception level signal 335 to an input terminal and with the correction control signal 352 as a level restriction reference voltage 717, and outputs the transmission power control signal 362 from an output terminal.

The determination unit for transmission power 460 may have another configuration as indicated in FIG. 17(a), for example, comprising a subtractor 555 built by means of an analog circuit. The subtractor 555 is inputted with the reception level signal 335 and the correction control signal 352, subtracts the correction control signal 352 from the reception level signal 335, and outputs the subtraction result as a transmission power control signal 362 from an output terminal.

The determination unit for transmission power 460 may have another configuration as indicated in FIG. 17(b), for example, comprising a D/A converter 569 for being inputted with and digital-to-analog converting the correction control signal 352 (a digital signal) and a subtractor 555 built by means of an analog circuit. The subtractor 555 is inputted with the reception level signal 335 and the D/A converted correction control signal 352, subtracts the correction control signal 352 from the reception level signal 335, and outputs the subtraction result as the transmission power control signal 362 from an output terminal.

The determination unit for transmission power 460 may have another configuration as indicated in FIG. 17(c), for example, comprising a A/D converter 568 for being inputted with and analog-to-digital converting the reception level signal 335, a subtractor 557 built by means of a logic circuit, and a D/A converter 569 for digital-to-analog converting an output signal from the subtractor 557 and outputting the transmission power control signal 362. The subtractor 557 is inputted with the A/D converted reception level signal 335 and the correction control signal 352 (a digital signal), subtracts the correction control signal 352 from the reception level signal 335, and outputs the subtraction result from an output terminal.

The transmitting unit 470 comprises at least a carrier wave generator 171, a modulator 172, and a transmission power controller 173.

A modulating signal 374 having "information to be transmitted to a partner" is inputted to the transmitting unit 470. The transmitting unit 470 generates a transmission signal 375 and inputs the transmission signal 375 into an antenna 111.

The transmission power controller 173 can change transmission power by the transmission power control signal 362 inputted from the determination unit for transmission power 460. The circuit example of the transmission power controller 173 is shown in FIG. 12.

An operation means 114 generates an operation signal 315 on the basis of the conducted operation and outputs an operation signal 315 to a control signal generator 450.

The control signal generator 450 is inputted with the operation signal 315 and determines the value of a correction control signal 352 to be generated on the basis of the state of the operation signal 315. The control signal generator 450 generates and outputs the correction control signal 352 to the determination unit for transmission power 460 and the determination unit for communication compatibility 430. The circuit example of the control signal generator 450 is shown in FIG. 13.

A role of a reception level generator 129 is described below. The reception level generator 129 receives information of the signal intensity, signal error rate, etc. from an automatic gain control amplifier A 124, an automatic gain control amplifier B 125, a demodulator 128, etc. which are the components of the receiving unit 420, and generates a reception level signal 335 in accordance with the evaluation results of the information.

The signal intensity, signal error rate, etc. may be used individually or together. In the latter case a plurality of items may be inputted in parallel or in the sum.

A role of a determination unit for communication compatibility 430 is described below. A reception level signal 335 is outputted corresponding to the signal intensity of the radio wave transmitted by a radio base station and received by a wireless transmitter-receiver. The determination unit for communication compatibility 430 determines if the radio wave with the transmission power controlled by the correction control signal 352 can be propagated to the base station taking account of the value of the reception level signal 335 and if the communication is compatible or not.

When the state of the determination signal for communication compatibility 343 is "communication is incompatible" the radio wave transmitted by the wireless transmitter-receiver may possibly not be received by the radio base station. Therefore, even if the radio base station requires starting communication the wireless transmitter-receiver can stop starting the communication.

Incidentally, restricting the communication with the radio base station transmitting weaker signal than the previously registered radio wave intensity by determining the communication compatibility by using the reception level signal 335 is identical to inhibiting the communication with the radio base station presenting a weak reception signal level by decreasing reception sensitivity.

The action of the wireless transmitter-receiver in the case when the transmission power is the "normal transmission power" is described as blow.

Note that the action of the wireless transmitter-receiver in the case when the transmission power is the "normal transmission power" is identical to the action of a conventional wireless terminal.

When the transmission power of the wireless transmitter-receiver is the "normal transmission power" the control signal generator 450 generates and outputs the correction control signal 352 having the value for sustaining the "normal transmission power" and the "normal reception sensitivity" to the determination unit for transmission power 460 and the determination unit for communication compatibility 430.

The determination unit for transmission power 460 determines the value of the transmission power control signal 362 to be outputted to the transmitting unit 470 in accordance with the value of the reception level signal 335.

Namely, when the value of the reception level signal 335 becomes high, the determination unit for transmission power 460 determines that a radio base station exists a short distance away, and therefore decreases the value of the transmission power control signal 362 to suppress the transmission power. Conversely, when the value of the reception level signal 335 becomes low, the determination unit for transmission power 460 determines that a radio base station exists in the distance, and therefore increases the value of the transmission power control signal 362.

Here, the correction control signal 352 inputted to the determination unit for transmission power 460 has the value for sustaining the "normal transmission power". In the latter case the value corresponds to the "maximum transmission power". Therefore, the value of the transmission power control signal 362 outputted to the transmitting unit 470 by the determination unit for transmission power 460 can be controlled up to the value corresponding to the "maximum transmission power".

Moreover, the correction control signal 352 inputted to the determination unit for communication compatibility 430 has the value for sustaining the "normal reception sensitivity" Therefore, the determination unit for communication compatibility 430 determines if the demodulated signal 332 at that time is propagated from the radio base station to which the wireless transmitter-receiver can transmit a radio wave propagated with the "maximum transmission power", and outputs the determination signal for communication compatibility 343 in either state of "communication is compatible" or "communication is incompatible". These actions are identical to those of a conventional wireless terminal.

In this situation, the conventional wireless terminal, however, does not allow a user to change transmission power to the "decreased transmission power below normal". Namely, a user cannot suppress the power consumption by decreasing transmission power in accordance with the situation.

Furthermore, if the transmission power is simply decreased by some means such a problem that "the radio wave propagated by the wireless transmitter-receiver becomes too weak to reach a radio base station, while the radio wave from the radio base station is received with the same intensity as before" is expected to be caused.

Here, the action of the wireless transmitter-receiver according to the present embodiment in the case when transmission power is changed to the "decreased transmission power below normal" and the action for inhibiting the problem are described.

For example, when a user makes an operation for decreasing the transmission power of the wireless transmitter-receiver below normal, the control signal generator 450 outputs the correction control signal 352 having the value for setting the "decreased transmission power below normal" and "decreased reception sensitivity below normal" to the determination unit for transmission power 460 and the determination unit for communication compatibility 430 in common.

Namely, the determination unit for transmission power 460 and the determination unit for communication compatibility 430 are controlled by a single operation.

The determination unit for transmission power 460 outputs the transmission power control signal 362 having the value within the upper limit value corresponding to the value of the correction control signal 352 to the transmitting unit 470.

Therefore, the transmitting unit 470 outputs the transmission signal 375 with the power within the upper limit value.

At the same time the control signal generator 450 outputs the correction control signal 352 to the determination unit for communication compatibility 430.

If the reception signal level propagated from a radio base station is higher (stronger) than the value indicated by the correction control signal 352, the determination unit for communication compatibility 430 sets the state of the determination signal for communication compatibility 343 for determining the communication compatibility to be "communication is compatible".

When the wireless transmitter-receiver receives the relatively weak radio wave propagated from the radio base station located at the position which the radio wave propagated with the "decreased transmission power below normal" from the wireless transmitter-receiver cannot reach, the value of the reception level signal 335 outputted by the receiving unit 420 becomes lower (weaker) than the value indicated by the correction control signal 352. Therefore, the determination unit for communication compatibility 430 sets the state of the determination signal for communication compatibility 343 to be "communication is incompatible".

The determination signal for communication compatibility 343 may be inputted at the start of the communication or at the time when the transmission signal 375 comes up to the upper limit value of the "decreased transmission power below normal".

Incidentally, the "value indicated by the correction control signal 352" is not a level in positive or negative logic in the circuit, but the value obtained by relatively comparing the "decreased transmission power below normal" with the "normal transmission power".

As mentioned above, by referring to the determination signal for communication compatibility 343 the wireless transmitter-receiver only performs the communication with the radio wave propagated from the radio base station located in the range which the radio wave propagated with the "decreased transmission power below normal" from the wireless transmitter-receiver can reach. Therefore, such a problem that "the radio wave propagated by the wireless transmitter-receiver becomes too weak to reach a radio base station, while the radio wave from the radio base station is received with the same intensity as before" does not occur.

Figure 6:
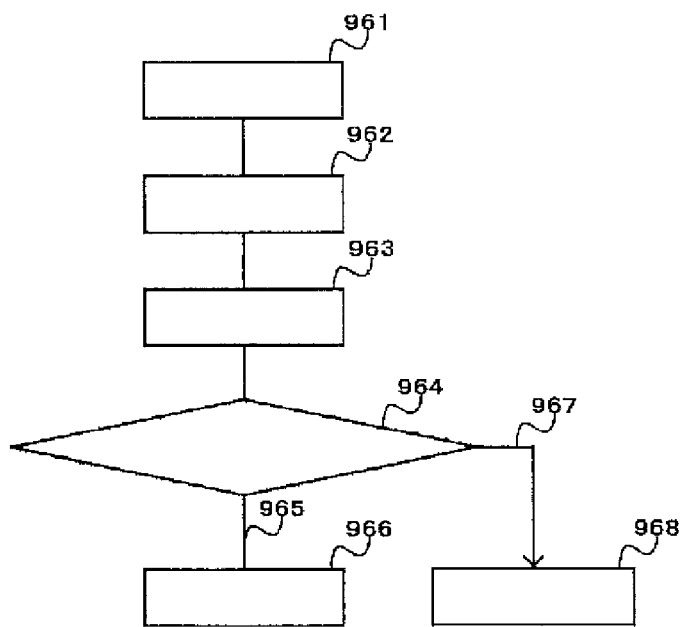
FIG. 6 is a flow chart showing the basic operation of a wireless transmitter-receiver according to an embodiment of the present invention.

FIG. 6 is a flow chart summarizing the action mentioned above, and FIG. 9 shows transmission power characteristics.

Figure 9:
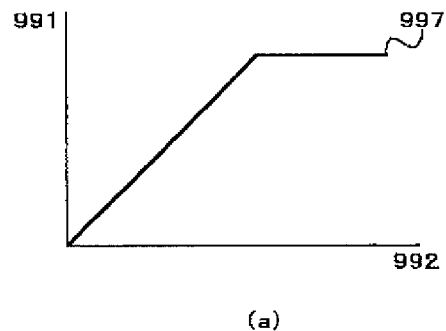
FIG. 9 shows (a) transmission power characteristics of a conventional wireless transmitter-receiver, and (b) transmission power characteristics of a wireless transmitter-receiver according to the second embodiment of the present invention.
Figure 9:
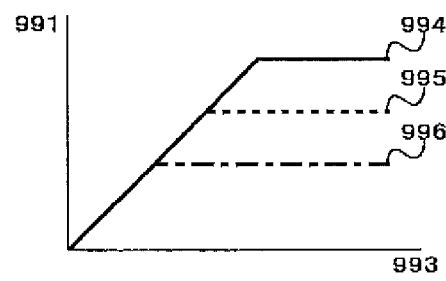

FIG. 9 shows (a) transmission power characteristics of a conventional wireless transmitter-receiver, and (b) transmission power characteristics of a wireless transmitter-receiver according to the present embodiment.

In FIG. 9 the transmission power characteristics without correction control is shown as 994, the transmission power characteristics corrected by −10 [dB] as 995, and the transmission power characteristics corrected by −20 [dB] as 996.

As mentioned above, the wireless transmitter-receiver according to the present embodiment is capable of varying the upper limit value of the transmission power thereof by a user, and of inhibiting the problem that may occur together with decreasing the maximum transmission power by changing the reception sensitivity in conjunction with the upper limit value of the transmission power.

The determination signal for communication compatibility 343 simulating the decreased reception level signal 335 is outputted downward while the real reception level signal 335 does not decrease.

Thereby a user can suppress power consumption by decreasing transmission power in accordance with the situation.

So far changing the value of the transmission power of the wireless transmitter-receiver is described in the case in which a user selects either of "normal transmission power" and "decreased transmission power below normal" by using a selector switch.

Another case may be employed by using a multi-step selector switch, etc. so that a user can select the "decreased transmission power below normal" having the value desired by a user by setting multi-selection with short steps such as 1, 0.5, 0.2, 0.1, 0.05, 0.01, 0.0.001 [W].

Moreover, another case may be employed by using a variable resistor so that a user can vary the value continuously and select the "decreased transmission power below normal" having the value desired by a user.

Displaying the states of the wireless transmitter-receiver, such as the upper limit value of transmission power set by a user, present transmission power, actual reception intensity, and decreased reception sensitivity, and warning messages is described as below.

When the upper limit value of transmission power and the reception sensitivity are changed in conjunction, both of or either of the upper limit value of transmission power and the present transmission power may be displayed.

Both of or either of the signal intensity of "normal reception sensitivity" and the "deceased reception sensitivity below normal" may be displayed.

By designating the state in which the communication is not available by decreasing the upper limit value of transmission power and the reception sensitivity in conjunction as the simulated out-of-range, the state may be indicated by displaying "simulated out-of-range". The other means, for example, a lamp, sound, and voice may be used to notify a user of the state. Thereby, a user knows if the communication is available or not.

If the intensity of the radio wave propagated from the "partner in radio transmission and reception" becomes weak in a call, the user may be notified of the state by means of displaying, a lamp, sound, or voice.

Furthermore, when the wireless transmitter-receiver is set to use the "decreased transmission power below normal", the information for notifying that "decreased transmission power below normal" is set to be used may be transmitted to the "partner in radio transmission and reception".

The concrete action of the wireless transmitter-receiver according to the present embodiment is described in an example of an ordinary commercial cellular phone.

The cellular phone has been set to use the "decreased transmission power below normal" from previous turning the power on and also to use the "decreased reception sensitivity below normal" at the same time. In this case, for example, the maximum transmission power is set to be 0.1 [W] and the reception sensitivity −10 [dB], while the normal maximum transmission power is 1 [W] and the normal reception sensitivity 0 [dB].

Now the cellular phone is placed at a camp site in a valley far from a base station. The communication cannot be connected even with the most powerful base station with the transmission power of 0.1 [W] and the reception sensitivity of −10 [dB]. The communication in the normal conditions with the transmission power of 1 [W] and the reception sensitivity of ±0 [dB] can be connected.

Here, suppose that in the condition wherein the power of a cellular phone is off a user turn on the power. A cellular phone, in general, transmits a control signal to a base station that can receive the signal, is registered with the base station, and is connected in the communication. However, the cellular phone is set to use the transmission power of 0.1 [W] at the maximum and the reception sensitivity of −10 [dB], and therefore cannot be connected.

Figure 7:
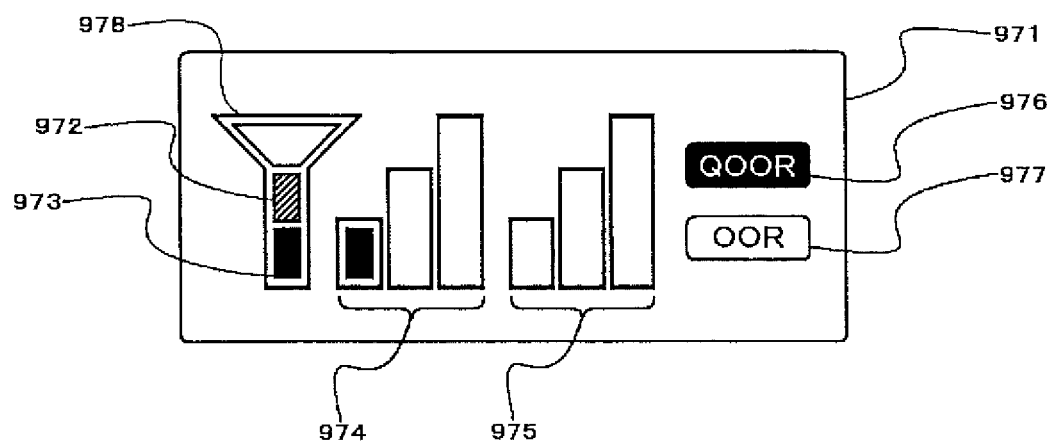
FIG. 7 shows an indication example of a wireless transmitter-receiver according to the second embodiment of the present invention.

At that time the cellular phone displays the indication shown in FIG. 7. The sign of transmission power 978 indicates that the maximum transmission power is restricted. The sign of signal intensity with normal reception sensitivity 974 indicates that the received signal is weak. The sign of signal intensity with decreased reception sensitivity 975 indicates that no radio wave is received. The incompatible state of the communication is caused by setting the transmission power to be the "decreased transmission power below normal" by the user. Therefore, the sign of the "simulated out-of-range" 976 is highlighted.

Figure 8:
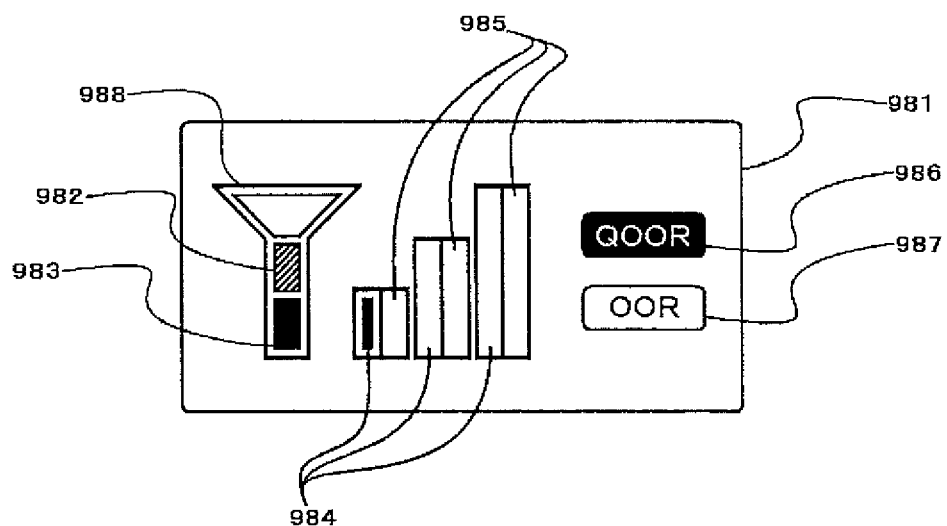
FIG. 8 shows an indication example of a wireless transmitter-receiver according to the second embodiment of the present invention.

FIG. 8 shows modified icon designs of FIG. 7. The sign of transmission power 988 indicates that the maximum transmission power is restricted. The sign of signal intensity with normal reception sensitivity 984 indicates that the received signal is weak. The sign of signal intensity with decreased reception sensitivity 985 indicates that no radio wave is received. The incompatible state of the communication is caused by setting the transmission power to be the "decreased transmission power below normal" by the user. Therefore, the sign of the "simulated out-of-range" 986 is highlighted.

Figure 10:
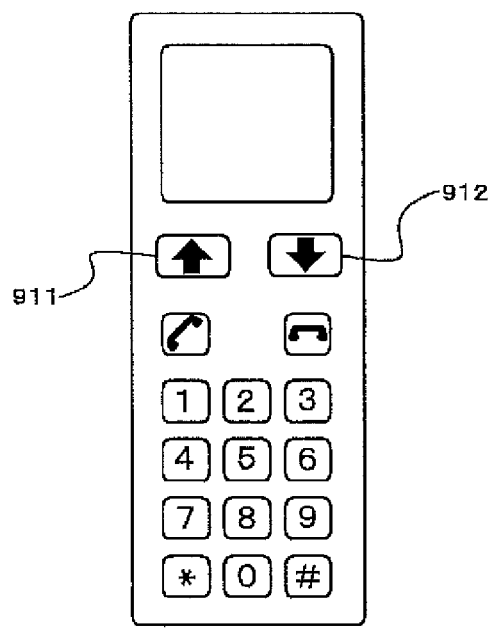
FIG. 10 is an external view.

The user wants to make a call by all means, and therefore pushes the key switch 911 in FIG. 10 that is for setting transmission power and reception sensitivity to be normal. Then, the transmission power of the cellular phone is set to be 1 [W] and the reception sensitivity to be the maximum, which is a normal condition. Thereby, the user can make a call.

After the communication ends, if the key switch 912 in FIG. 10 for setting transmission power and reception sensitivity to be in lower states than normal is pushed the maximum transmission power is set to be 0.1 [W] and the reception sensitivity −10 [dB].

In such a manner the wireless transmitter-receptor according to the present embodiment decreases the upper limit value of transmission power by the operation of the operation means 114, and decreases the reference value in determining if the communication is compatible in accordance with the decreased upper limit value of transmission power.

Thereby, a user can determine the upper limit value of transmission power of the wireless transmitter-receiver, and thus manage the transmission power to suppress power consumption and to elongate a continuous operation time. Moreover, the wireless transmitter-receiver can eliminate the influence of radio frequency electromagnetic field on a human body. Furthermore, the degree of imbalance in the "symmetry of communication" can be minimized.

Note that the correction control signal 352 inputted to the determination unit for communication compatibility 430 in the present embodiment corresponds to the "reference value in determining if the communication is compatible" in Invention 4.

Third Embodiment

Figure 3:
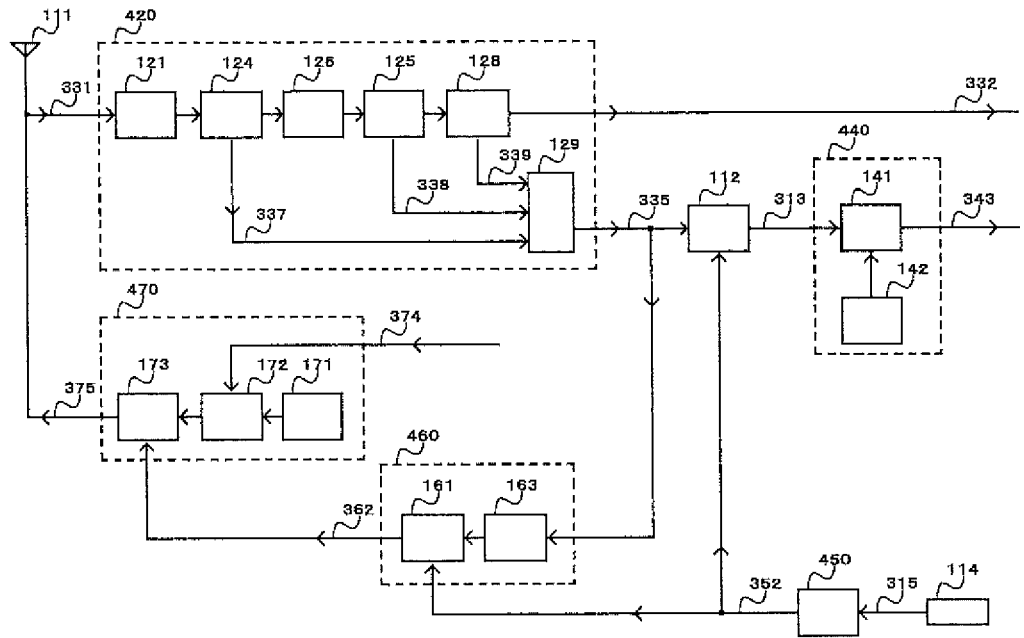
FIG. 3 shows a basic configuration of a wireless transmitter-receiver according to a third embodiment of the present invention.

A wireless transmitter-receiver according to a third embodiment of the present invention is explained. FIG. 3 shows a basic configuration of a wireless transmitter-receiver according to a third embodiment.

The wireless transmitter-receiver has a different configuration from that of the wireless transmitter-receiver according to the second embodiment while having the equivalent effect as the second embodiment.

In the wireless transmitter-receiver according to the second embodiment the correction control signal 352 is outputted to both of the determination unit for transmission power 460 and the determination unit for communication compatibility 430 at the same time, and thus, transmission power and reception sensitivity are controlled in conjunction.

Moreover, the determination unit for communication compatibility 430 determines if fine communication to a radio base station can be expected by comparing the value of the reception level signal 335 with the value of the correction control signal 352.

In comparison with the wireless transmitter-receiver according to the second embodiment, the wireless transmitter-receiver according to the present embodiment is provided with a sensitivity converter 112 on the input side of a determination unit for communication compatibility 440 and a reference-value generator 142 in addition to a level comparator 141 in the determination unit for communication compatibility 440.

Figure 18:
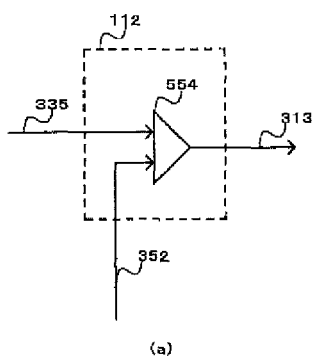
FIG. 18 is a circuit example of a sensitivity converter.
Figure 18:
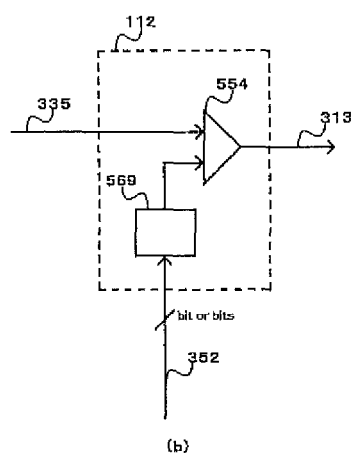
Figure 18:
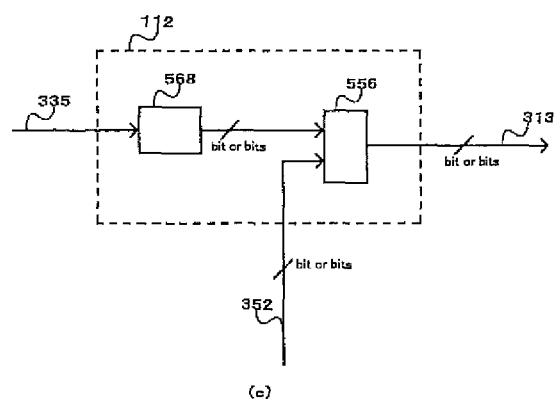

FIG. 18 shows a circuit example of the sensitivity converter 112. The sensitivity converter 112 may be configured as shown in FIG. 18(a). The sensitivity converter 112 has a configuration comprising an adder 554 built by means of an analog circuit in the example of FIG. 18(a). The adder 554 is inputted with a reception level signal 335 and a correction control signal 352, adds the correction control signal 352 to the reception level signal 335, and outputs a converted reception level signal 313 that is a result of addition from an output terminal.

The sensitivity converter 112 may be configured as shown in FIG. 18(b). The sensitivity converter 112 has a configuration comprising a D/A converter 569 for being inputted with and digital-to-analog converting the correction control signal 352 (a digital signal) and an adder 554 built by means of an analog circuit in the example of FIG. 18(b). The adder 554 is inputted with a reception level signal 335 and a D/A converted correction control signal 352, adds the correction control signal 352 to the reception level signal 335, and outputs a converted reception level signal 313 that is a result of addition from an output terminal.

The sensitivity converter 112 may be configured as shown in FIG. 18(c). The sensitivity converter 112 has a configuration comprising an A/D converter 568 for being inputted with and analog-to-digital converting the reception level signal 335 and an adder 556 built by means of a logic circuit in the example of FIG. 18(c). The adder 556 is inputted with an A/D converted reception level signal 335 and a correction control signal 352 (a digital signal), adds the correction control signal 352 to the reception level signal 335, and outputs a converted reception level signal 313 (a digital signal) that is a result of addition from an output terminal.

Figure 19:
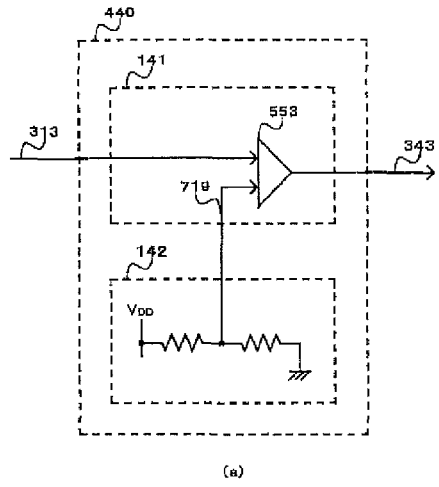
FIG. 19 is a circuit example of an analogue determination unit installed with a reference-value generator for communication compatibility.
Figure 19:
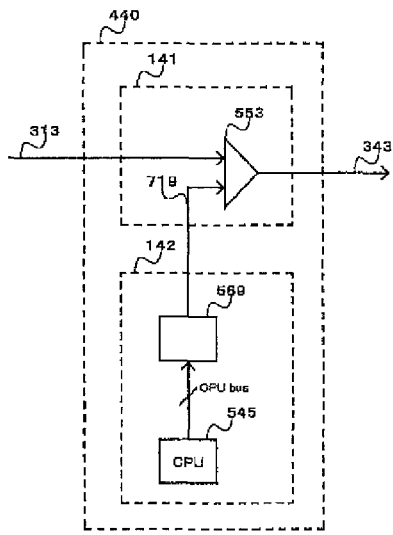
Figure 19:
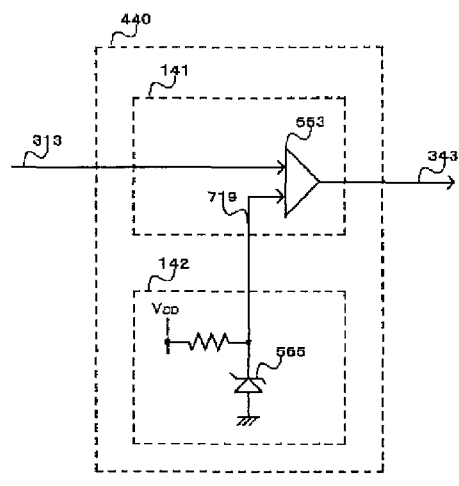
Figure 20:
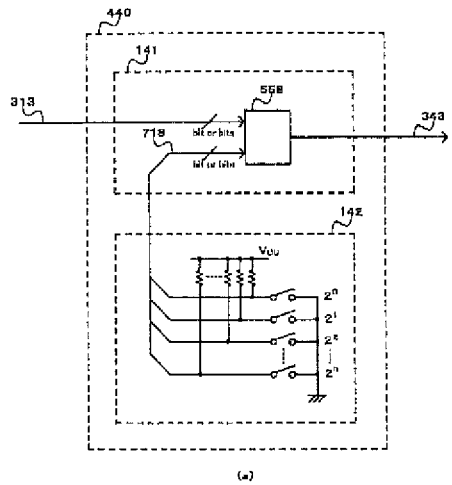
FIG. 20 is a circuit example of a digital determination unit installed with a reference-value generator for communication compatibility.
Figure 20:
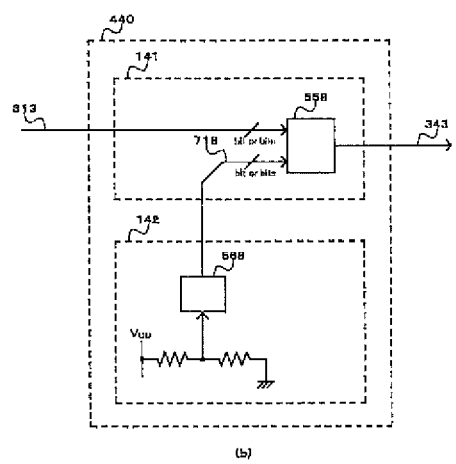
Figure 20:
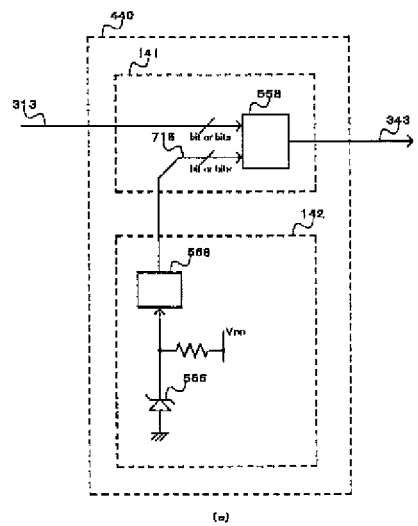

Furthermore, FIG. 19 and FIG. 20 show circuit examples of the determination unit for communication compatibility 440. The determination unit for communication compatibility 440 may be configured as shown in FIG. 19(a). The determination unit for communication compatibility 440 has a configuration comprising a level comparator 141 and a reference-value generator 142 in the example of FIG. 19(a). The level comparator 141 has a configuration comprising a comparator 553 built by means of an analog circuit. The comparator 553 is inputted with the converted reception level signal 313 to a non-inverting input terminal and with a reference voltage 719 to an inverting-input terminal, and outputs the determination signal for communication compatibility 343 from an output terminal. The reference-value generator 142 has a configuration comprising a first resistance element the one end of which is connected with a power source VDD and the other end of which is connected with an inverting input terminal of the comparator 553 and a second resistance element the one end of which is connected with the inverting input terminal of the comparator 553 and the other end of which is grounded.

The determination unit for communication compatibility 440 may be configured as shown in FIG. 19(b). The determination unit for communication compatibility 440 has a configuration comprising a level comparator 141 and a reference-value generator 142 in the example of FIG. 19(b). The level comparator 141 has an identical configuration to FIG. 19(a). The reference-value generator 142 has a configuration comprising a CPU 545 for outputting a data signal (a digital signal) corresponding to the reference voltage 719 and a D/A converter 569 for digital-to-analog converting and outputting the data signal from the CPU 545 as the reference voltage 719.

The determination unit for communication compatibility 440 may be configured as shown in FIG. 19(c). The determination unit for communication compatibility 440 has a configuration comprising a level comparator 141 and a reference-value generator 142 in the example of FIG. 19(c). The level comparator 141 has an identical configuration to FIG. 19(a). The reference-value generator 142 has a configuration comprising a resistance element the one end of which is connected with a power source VDD and the other end of which is connected with an inverting input terminal of the comparator 553 and a zener diode 565 the cathode terminal of which is connected with the inverting input terminal of the comparator 553 and the anode terminal of which is grounded.

The determination unit for communication compatibility 440 may be configured as shown in FIG. 20(a). The determination unit for communication compatibility 440 has a configuration comprising a level comparator 141 and a reference-value generator 142 in the example of FIG. 20(a). The level comparator 141 has a configuration comprising a weighted comparator 558 built by means of a logic circuit. The comparator 558 is inputted with the converted reception level signal 313 (a digital signal) to a first input terminal and with a reference value 718 to a second terminal, and outputs a determination signal for communication compatibility 343 from an output terminal. The reference-value generator 142 comprises n+1 resistance elements the one ends of which are connected with the power source VDD and n+1 switch elements the one ends of which are respectively connected with the other ends of the n+1 resistance elements and the other ends of which are grounded. Output signals from the other ends of the n+1 resistance elements correspond to respective bits of a reference value 718 composed of n+1 bits.

The determination unit for communication compatibility 440 may be configured as shown in FIG. 20(b). The determination unit for communication compatibility 440 has a configuration comprising a level comparator 141 and a reference-value generator 142 in the example of FIG. 20(b). The level comparator 141 has an identical configuration to FIG. 20(a). The reference-value generator 142 has a configuration comprising a first resistance element the one end of which is connected with a power source VDD, a second resistance element the one end of which is grounded, and an A/D converter 568 for analog-to-digital converting the output signal from the other ends of the first resistance element and the second resistance element and outputting a reference value 718.

The determination unit for communication compatibility 440 may be configured as shown in FIG. 20(c). The determination unit for communication compatibility 440 has a configuration comprising a level comparator 141 and a reference-value generator 142 in the example of FIG. 20(c). The level comparator 141 has an identical configuration to FIG. 20(a). The reference-value generator 142 has a configuration comprising a resistance element the one end of which is connected with a power source VDD, a zener diode 565 the anode terminal of which is grounded, and an A/D converter 568 for analog-to-digital converting the output signal from the other end of the resistance element and the cathode terminal of the zener diode 565 and outputting a reference value 718.

Here, a correction control signal 352 outputted from a control signal generator 450 is inputted to a determination unit for transmission power 460 and a sensitivity converter 112 at the same time. The correction control signal 352 thereby controls transmission power and reception sensitivity in conjunction.

A reception level signal 335 outputted from a receiving unit 420 is inputted to the sensitivity converter 112. The value of the reception level signal 335 is converted with a conversion rate which changes according to the value of a correction control signal 352 and outputted as a converted reception level signal 313.

The converted reception level signal 313 is inputted to a determination unit for communication compatibility 440 and compared with the value generated by a reference value generator 142 by a level comparator 141 for the determination unit for communication compatibility 440 to determine the state of a determination signal for communication compatibility 343.

The determination signal for communication compatibility 343 is outputted in either state of "communication is compatible" or "communication is incompatible".

Note that the value generated by the reference value generator 142 is determined and registered in a suitable value by any of a communication carrier, a device manufacturer, and a user. Moreover, a wireless transmitter-receiver may calculate and register an optimum value. Furthermore, the combination of the plurality of members mentioned above may be employed.

As mentioned above the wireless transmitter-receiver according to the present embodiment enables a user to change the upper limit value of transmission power of the wireless transmitter-receiver. The wireless transmitter-receiver is also capable of inhibiting the problem that may occur together with decreasing the maximum transmission power by changing the reception sensitivity in conjunction with the upper limit value of the transmission power and referring to the determination signal for communication compatibility 343.

A user thereby can suppress the power consumption by decreasing transmission power in accordance with the situation.

Note that the correction control signal 352 inputted to the sensitivity converter 112 in the present embodiment corresponds to the reference value in determining if the communication is compatible in Invention 4.

Fourth Embodiment

Figure 4:
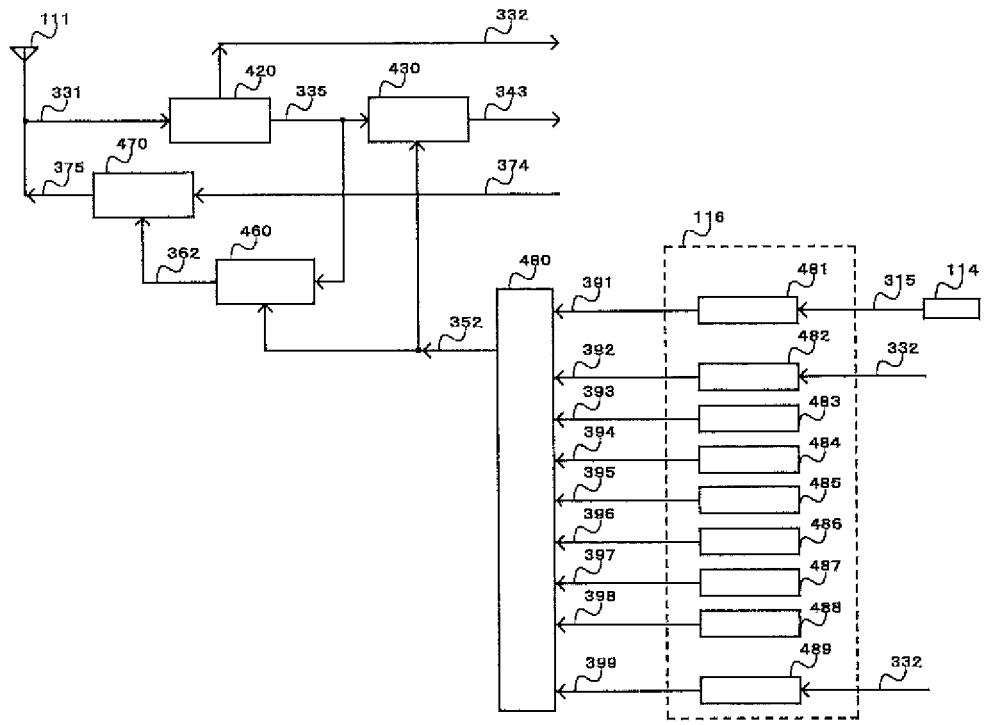
FIG. 4 shows a basic configuration of a wireless transmitter-receiver according to a fourth embodiment of the present invention.

A wireless transmitter-receiver according to a fourth embodiment of the present invention is explained. The fourth embodiment corresponds to examples of the wireless transmitter-receiver of Inventions 11-15. FIG. 4 shows a basic configuration of the wireless transmitter-receiver according to the fourth embodiment.

The wireless transmitter-receiver is a wireless transmitter-receiver according to the second embodiment added with a means for detecting and processing various events 116.

The means for detecting and processing various events 116, in the situation intended or previously registered by a user, changes transmission power and reception sensitivity in conjunction.

The examples of the wireless transmitter-receiver of Invention 11, in particular, only the added parts are described below.

The wireless transmitter-receiver, due to the means mentioned below, is capable of changing an upper limit value of transmission power by an operation of the user, and also capable of inhibiting the problem that may occur together with decreasing only the maximum transmission power by changing the reception sensitivity in conjunction with the upper limit value of the transmission power.

The example of the wireless transmitter-receiver of Invention 11 is the wireless transmitter-receiver according to the second embodiment added with a operation means 114, an operating direction processor 481, and a control signal generator 480 which is capable of processing request information 391.

Figure 14:
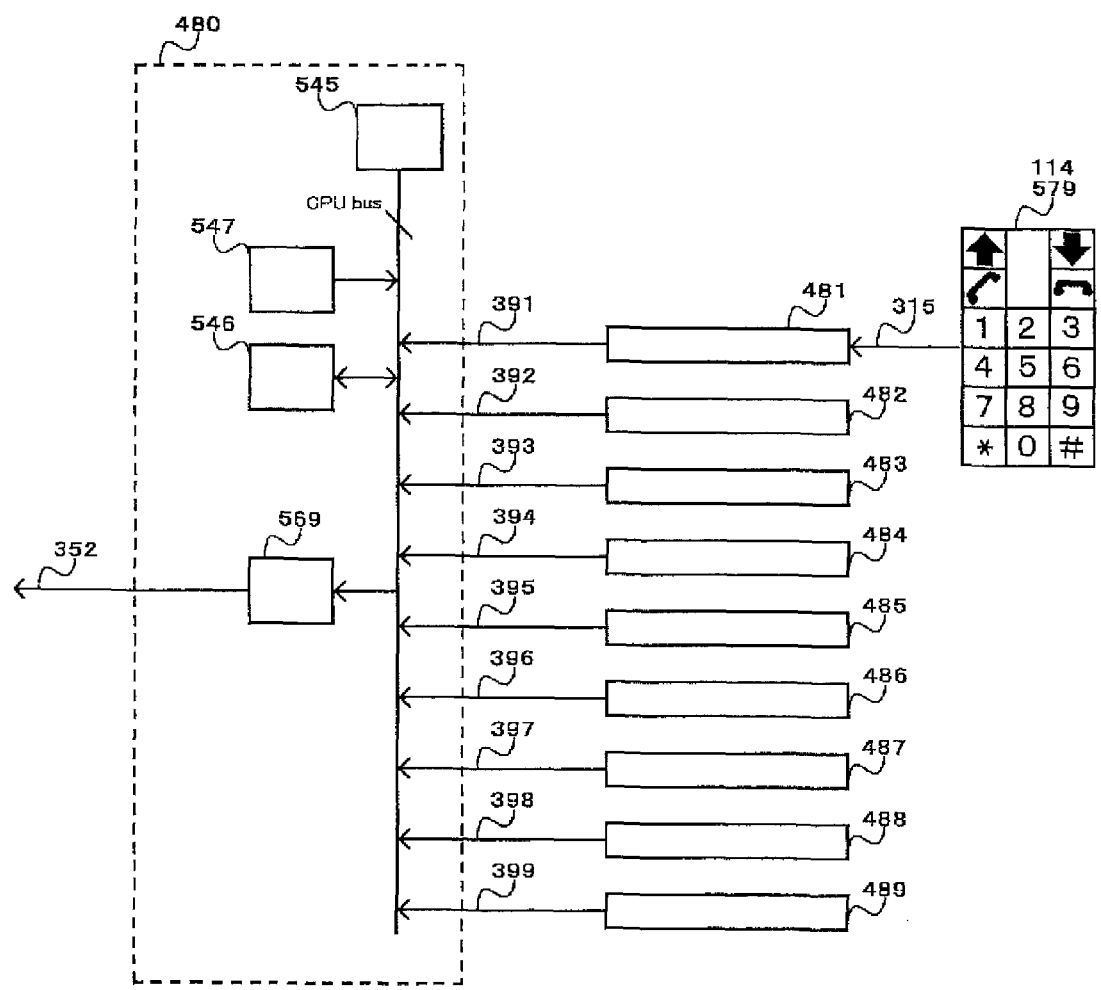
FIG. 14 is a circuit example of a control signal generator.

FIG. 14 shows a circuit example of the control signal generator 480. As shown in FIG. 14 the control signal generator 480 has a configuration comprising a CPU 545 for performing calculation and control on the basis of a control program, a ROM 547 for previously storing the control program, etc. of the CPU 545 in a prescribed region, a RAM 546 for storing the data read out from the ROM 547, etc. and calculation results necessary in the calculation process of the CPU 545, and a D/A converter 569 for digital-to-analog converting a data signal from the CPU 545 and outputting a correction control signal 352. These components are connected with each other by a "CPU bus" that is a signal line for transmitting data so as to be capable of transferring/receiving data.

The operating direction processor 481 is connected with the "CPU bus" via an interface (I/F) (not illustrated), and the request information 391 from the operating direction processor 481 is inputted to the control signal generator 480. The operation means 114 is connected with the operating direction processor 481, which is inputted with an operation signal 315 from the operation means 114.

A remote operating direction detecting processor 482 is connected with the "CPU bus" via an I/F (not illustrated), and the request information 392 from the remote operating direction detecting processor 482 is inputted to the control signal generator 480.

A communication partner detecting comparator 483 is connected with the "CPU bus" via an I/F (not illustrated), and the request information 393 from the communication partner detecting comparator 483 is inputted to the control signal generator 480.

A wired earphone and microphone detector 484 is connected with the "CPU bus" via an I/F (not illustrated), and the request information 394 from the wired earphone and microphone detector 484 is inputted to the control signal generator 480.

A wireless earphone and microphone detector 485 is connected with the "CPU bus" via an I/F (not illustrated), and the request information 395 from the wireless earphone and microphone detector 485 is inputted to the control signal generator 480.

A present position detecting area comparator 486 is connected with the "CPU bus" via an I/F (not illustrated), and the request information 396 from the present position detecting area comparator 486 is inputted to the control signal generator 480.

A time information acquiring hours comparator 487 is connected with the "CPU bus" via an I/F (not illustrated), and the request information 397 from the time information acquiring hours comparator 487 is inputted to the control signal generator 480.

An emergency call transmission detector 488 is connected with the "CPU bus" via an I/F (not illustrated), and the request information 398 from the emergency call transmission detector 488 is inputted to the control signal generator 480.

An emergency warning reception detector 489 is connected with the "CPU bus" via an I/F (not illustrated), and the request information 399 from the emergency warning reception detector 489 is inputted to the control signal generator 480.

The control signal generator 480 is provided with the operating direction processor 481 on the input side. The operating direction processor 481 is provided with the operation means 114 on the input side.

The operation signal 315 is inputted from the operation means 114 to the operating direction processor 481. The request information 391 is inputted from the operating direction processor 481 to the control signal generator 480.

The role of the operation means 114 is implemented by a selector switch, push button switch, and variable resistor. When a user perform an operation the operation means 114 generates and inputs the operation signal 315 to the operating direction processor 481.

The operating direction processor 481 executes processing on the basis of the operation signal 315 outputted by the operation means 114 and outputs the result to the control signal generator 480 as the request information 391.

The control signal generator 480 generates and outputs a correction control signal 352 in accordance with the request information 391.

Thereby, the operation performed by the user can change an upper limit value of transmission power and reception sensitivity in conjunction therewith, and also restore the upper limit value of transmission power to the maximum value.

Thus, a user can switch transmission power to "decreased transmission power below normal" and restore to "normal transmission power" by the operation of the user. Reception sensitivity is also switched to "decreased reception sensitivity below normal" and restored to "normal reception sensitivity" in conjunction with switching of transmission power.

For example, the action of the operating direction processor 481 and the control signal generator 480 when a user set the upper limit value of transmission power to be lower than the normal value by operating the operation means 114 of a main body is described below.

When a user operates an operation means 114 of a main body the operation means 114 outputs an operation signal 315 to an operating direction processor 481.

The operating direction processor 481 processes the inputted operation signal 315 and outputs the request information 391 for changing the upper limit value of transmission power to a control signal generator 480.

The control signal generator 480 outputs a correction control signal 352 for changing the upper limit value of transmission power and the reception sensitivity in accordance with the inputted request information 391.

The examples of the wireless transmitter-receiver of invention 12, in particular, only the added parts are described below.
The wireless transmitter-receiver, due to the addition of the means mentioned below, can change the upper limit value of transmission power and also reception sensitivity in conjunction therewith by remote operation using a communication means from outside.

The example of the wireless transmitter-receiver of Invention 12 is the wireless transmitter-receiver according to the second embodiment added with a remote operating direction detecting processor 482 and a control signal generator 480 which is capable of processing request information 392. FIG. 14 shows a circuit example of the control signal generator 480.

The control signal generator 480 is provided with the remote operating direction detecting processor 482 on the input side.
A demodulated signal 332 is outputted from the receiving unit 420 and inputted to the remote operating direction detecting processor 482.

Request information 392 is outputted from the remote operating direction detecting processor 482 and inputted to the control signal generator 480.

The remote operating direction detecting processor 482 detects remote operating direction information in the information transmitted from the outside by using communication means, creates the request information 392 from the results, and outputs the request information 392 to the control signal generator 480.

Moreover, the remote operating direction detecting processor 482 determines if the remote operation is valid or not by comparing the identification information such as a line number, IP address, URL, mail address, and MAC address of a remote operation sender with the "previously registered identification information of remote operation senders".

The control signal generator 480 outputs a correction control signal 352 for changing the upper limit value of transmission power and the reception sensitivity on the basis of the request information 392 outputted by the remote operating direction detecting processor 482.

Note that the "previously registered identification information of remote operation senders" is registered with intention by any of a communication carrier, a device manufacturer, and a user. Moreover, a wireless transmitter-receiver may create and register the information. Furthermore, the combination of the plurality of members mentioned above may be employed.

Here, the contents of the "previously registered identification information of remote operation senders" is considered to be a line number, IP address, URL, mail address, MAC address, etc. identifying the specific person in charge of management of the wireless transmitter-receiver.

The remote operation may use any communication containing the operating direction information. For example, a mail containing an operating direction code, a voice call signal containing operating direction pulses, a voice call signal containing operating direction tones, a phone call containing a number of operating direction times, etc. may be used.

Moreover, the remote operation makes it possible for a wireless transmitter-receiver in charge of management to operate and manage the states of transmission power of a plurality of the other wireless transmitter-receivers.

The examples of the wireless transmitter-receiver of Invention 13, in particular, only the added parts are described below.

The wireless transmitter-receiver, due to the means mentioned below, restores the decreased upper limit value of transmission power to the normal value when the wireless transmitter-receiver calls the previously registered "partner in the information transmission".

The example of the wireless transmitter-receiver of Invention 13 is the wireless transmitter-receiver according to the second embodiment added with a communication partner detecting comparator 483 and a control signal generator 480 which is capable of processing request information 393. FIG. 14 shows a circuit example of the control signal generator 480.

The control signal generator 480 is provided with a communication partner detecting comparator 483 on the input side.
The request information 393 is outputted from the communication partner detecting comparator 483 and inputted to the control signal generator 480.

The communication partner detecting comparator 483 detects the identification information such as a line number, IP address, URL, mail address, and MAC address of the "partner in the information transmission" to start calling to, compares the identification information with the "identification information of previously registered important communication partners", and outputs the request information 393 to the control signal generator 480 on the basis of the comparison results.

The control signal generator 480 makes the upper limit value of transmission power be greater or the maximum, and generates and outputs a correction control signal 352 for changing the reception sensitivity in conjunction with the upper limit value of transmission power.

For example, in the state in which transmission power has been set to be the "decreased transmission power below normal" when a call to a "partner in the information transmission" registered in the "identification information of previously registered important communication partners" is started, the "decreased transmission power below normal" can be restored to the "normal transmission power". Moreover, the reception sensitivity that has been "decreased reception sensitivity below normal" also returns to the "normal reception sensitivity" in conjunction with the transmission power.

Note that the "identification information of previously registered important communication partners" is registered by any of a communication carrier, a device manufacturer, and a user. Moreover, a wireless transmitter-receiver may register a partner who has made many calls. Furthermore, the combination of the plurality of members mentioned above may be employed.

The contents of the "identification information of previously registered important communication partners" is considered to contain the line numbers, IP addresses, URLs, mail addresses, MAC addresses, etc. identifying, for example, the public institutions requiring high emergency in general such as police stations and firehouses, and the partners important to the user such as the family members, special friends, workplaces, and special business parties.

The examples of the wireless transmitter-receiver of Invention 14, in particular, only the added parts are described below.

The wireless transmitter-receiver of Invention 14 restores the transmission power that has been "decreased transmission power below normal" to the "normal transmission power" when the call from a "partner in the information transmission" registered in "identification information of previously registered important communication partners" is received. Moreover, the reception sensitivity that has been "decreased reception sensitivity below normal" also returns to the "normal reception sensitivity" in conjunction with the transmission power.

The example of the wireless transmitter-receiver of Invention 14 functions on the same configuration as that of the example of the wireless transmitter-receiver of Invention 13.

The communication partner detecting comparator 483 detects the identification information such as a line number, IP address, URL, mail address, and MAC address of the "partner in the information transmission" the call of which is received, compares the identification information with the "identification information of previously registered important communication partners", and outputs the request information 393 to the control signal generator 480 on the basis of the comparison results.

The control signal generator 480 makes the upper limit value of transmission power be greater or the maximum, and generates and outputs a correction control signal 352 for changing the reception sensitivity in conjunction with the upper limit value of transmission power.

For example, in the state in which transmission power has been set to be "decreased transmission power below normal" when a call from a "partner in the information transmission" registered in the "identification information of previously registered important communication partners" is received, the "decreased transmission power below normal" can be restored to the "normal transmission power". Moreover, the reception sensitivity that has been "decreased reception sensitivity below normal" also returns to the "normal reception sensitivity" in conjunction with the transmission power.

In the state in which the transmission power is restored to "normal transmission power" during the communication with the "partner in the information transmission" registered in the "identification information of previously registered important communication partners", when the communication ends the transmission power is switched again to the "decreased transmission power below normal" at a certain timing. The transmission power may be switched to the "decreased transmission power below normal" soon after the communication ends or some period of time after the communication ends. Moreover, the state of reception sensitivity is switched in conjunction with the state of the transmission power.

An example of the wireless transmitter-receiver of Invention 15 is described below.

In the example of the wireless transmitter-receiver of Invention 15, the wireless transmitter-receiver according to the second embodiment, due to the additional means mentioned below for detecting and processing specific events, is capable of changing the upper limit value of transmission power and changing the reception power in conjunction therewith.

A wired earphone and microphone detector 484, in particular, the additional part is described below.

The wireless transmitter-receiver, due to the added means mentioned below, restores the decreased upper limit value of transmission power to the normal value when a wired earphone or wired microphone is connected.

The example of the wireless transmitter-receiver is the wireless transmitter-receiver according to the second embodiment added with a wired earphone and microphone detector 484 and a control signal generator 480 which is capable of processing request information 394. FIG. 14 shows a circuit example of the control signal generator 480.

The control signal generator 480 is provided with the wired earphone and microphone detector 484 on the input side.

The request information 394 is outputted from the wired earphone and microphone detector 484 and inputted to the control signal generator 480.

The wired earphone and microphone detector 484 detects the connection of a wired earphone or wired microphone with a main body and then outputs the request information 394 to the control signal generator 480.

The control signal generator 480 makes the upper limit value of transmission power be greater or the maximum, and changes the reception sensitivity in conjunction therewith.

Namely, the "decreased transmission power below normal" is restored to the "normal transmission power". Moreover, the reception sensitivity that has been "decreased reception sensitivity below normal" also returns to the "normal reception sensitivity" in conjunction with the state of transmission power.

A wireless earphone and microphone detector 485, in particular, the additional part is described below.

The wireless transmitter-receiver, due to the added means mentioned below, restores the decreased upper limit value of transmission power to the normal value when a wireless earphone or wireless microphone is connected.

The example of the wireless transmitter-receiver is the wireless transmitter-receiver according to the second embodiment added with a wireless earphone and microphone detector 485 and a control signal generator 480 which is capable of processing request information 395. FIG. 14 shows a circuit example of the control signal generator 480.

The control signal generator 480 is provided with the wireless earphone and microphone detector 485 on the input side.

The request information 395 is outputted from the wireless earphone and microphone detector 485 and inputted to the control signal generator 480.

The wireless earphone and microphone detector 485 detects the connection of a wireless earphone or wireless microphone with a main body and then outputs the request information 395 to the control signal generator 480.

The control signal generator 480 makes the upper limit value of transmission power be greater or the maximum, and changes the reception sensitivity in conjunction therewith.

Namely, the "decreased transmission power below normal" is restored to the "normal transmission power". Moreover, the reception sensitivity that has been "decreased reception sensitivity below normal" also returns to the "normal reception sensitivity" in conjunction with the state of transmission power.

A present position detecting area comparator 486, in particular, the additional part is described below.

The wireless transmitter-receiver, due to the added means mentioned below, restores the decreased upper limit value of transmission power to the normal value when the wireless transmitter-receiver is located in the previously registered area.

The example of the wireless transmitter-receiver is the wireless transmitter-receiver according to the second embodiment added with a present position detecting area comparator 486 and a control signal generator 480 which is capable of processing request information 396. FIG. 14 shows a circuit example of the control signal generator 480.

The control signal generator 480 is provided with the present position detecting area comparator 486 on the input side.

The request information 396 is outputted from the present position detecting area comparator 486 and inputted to the control signal generator 480.

The present position detecting area comparator 486 detects and compares the present position information with the "previously registered area information", and outputs the request information 396 to the control signal generator 480.

The control signal generator 480 makes the upper limit value of transmission power be greater or the maximum, and changes the reception sensitivity in conjunction therewith.

Namely, the "decreased transmission power below normal" is restored to the "normal transmission power". Moreover, the reception sensitivity that has been "decreased reception sensitivity below normal" also returns to the "normal reception sensitivity" in conjunction with the state of transmission power.

Note that the "previously registered area information" is registered with intention by any of a communication carrier, a device manufacturer, and a user. Moreover, a wireless transmitter-receiver may create and register the area information. Furthermore, the combination of the plurality of members mentioned above may be employed.

The contents of the "previously registered area information" is considered to contain the sites of medical facilities, etc.

A time information acquiring hours comparator 487, in particular, the additional part is described below.

The wireless transmitter-receiver, due to the added means mentioned below, restores the decreased upper limit value of transmission power to the normal value when it is in the previously registered period of time.

The example of the wireless transmitter-receiver is the wireless transmitter-receiver according to the second embodiment added with a time information acquiring hours comparator 487 and a control signal generator 480 which is capable of processing request information 397. FIG. 14 shows a circuit example of the control signal generator 480.

The control signal generator 480 is provided with the time information acquiring hours comparator 487 on the input side.

The request information 397 is outputted from the time information acquiring hours comparator 487 and inputted to the control signal generator 480.

The time information acquiring hours comparator 487 acquires and compares the present time information with the "previously registered period of time", and outputs the request information 397 to the control signal generator 480.

The control signal generator 480 makes the upper limit value of transmission power be greater or the maximum, and changes the reception sensitivity in conjunction therewith.

Namely, the "decreased transmission power below normal" is restored to the "normal transmission power". Moreover, the reception sensitivity that has been "decreased reception sensitivity below normal" also returns to the "normal reception sensitivity" in conjunction with the state of transmission power.

Note that the "previously registered period of time" is registered with intention by any of a communication carrier, a device manufacturer, and a user. Moreover, a wireless transmitter-receiver may create and register the information of a period of time. Furthermore, the combination of the plurality of members mentioned above may be employed.

The contents of the "previously registered period of time" are considered to contain the commuting hours to/from workplaces, schools, cram schools, etc.

An emergency call transmission detector 488, in particular, the additional part is described below.

The wireless transmitter-receiver, due to the added means mentioned below, restores the decreased upper limit value of transmission power to the normal value when an emergency call transmission function is used.

The example of the wireless transmitter-receiver is the wireless transmitter-receiver according to the second embodiment added with an emergency call transmission detector 488 and a control signal generator 480 which is capable of processing request information 398. FIG. 14 shows a circuit example of the control signal generator 480.

The control signal generator 480 is provided with the emergency call transmission detector 488 on the input side.

The request information 398 is outputted from the emergency call transmission detector 488 and inputted to the control signal generator 480.

The emergency call transmission detector 488 detects the information outputted from the emergency call transmission function, and outputs the request information 398 to the control signal generator 480.

The control signal generator 480 makes the upper limit value of transmission power be greater or the maximum, and changes the reception sensitivity in conjunction therewith.

Namely, the "decreased transmission power below normal" is restored to the "normal transmission power". Moreover, the reception sensitivity that has been "decreased reception sensitivity below normal" also returns to the "normal reception sensitivity" in conjunction with the state of transmission power.

Note that the emergency call transmission function is provided to the wireless transmitter-receiver in the main body and enables a user to make a call to emergency contacts immediately and easily without inputting the line number in an emergency such as a fire and the other hazards.

The emergency contacts are considered to contain the public institutions such as police stations and firehouses, security companies, school staff, neighborhood association, and guardians.

An emergency warning reception detector 489, in particular, the additional part is described below.

The wireless transmitter-receiver, due to the added means mentioned below, restores the decreased upper limit value of transmission power to the normal value when an emergency warning signal is received.

The example of the wireless transmitter-receiver is the wireless transmitter-receiver according to the second embodiment added with an emergency warning reception detector 489 and a control signal generator 480 which is capable of processing request information 399. FIG. 14 shows a circuit example of the control signal generator 480.

The control signal generator 480 is provided with the emergency warning reception detector 489 on the input side.

A demodulated signal 332 is outputted from a receiving unit 420 and inputted to the emergency warning reception detector 489.

The request information 399 is outputted from the emergency warning reception detector 489 and inputted to the control signal generator 480.

The emergency warning reception detector 489 detects the received emergency warning signal, and outputs the request information 399 to the control signal generator 480.

The control signal generator 480 makes the upper limit value of transmission power be greater or the maximum, and changes the reception sensitivity in conjunction therewith.

Namely, the "decreased transmission power below normal" is restored to the "normal transmission power". Moreover, the reception sensitivity that has been "decreased reception sensitivity below normal" also returns to the "normal reception sensitivity" in conjunction with the state of transmission power.

Note that the emergency warning signal is a radio signal provided by activating the emergency call transmission function. The emergency warning signal may be a radio signal provided on the basis of the earthquake information or tsunami information issued by administrative agencies.

Note that the correction control signal 352 inputted to the determination unit for communication compatibility 430 in the present embodiment corresponds to the "reference value in determining if the communication is compatible" in Invention 4.

Fifth Embodiment

Figure 5:
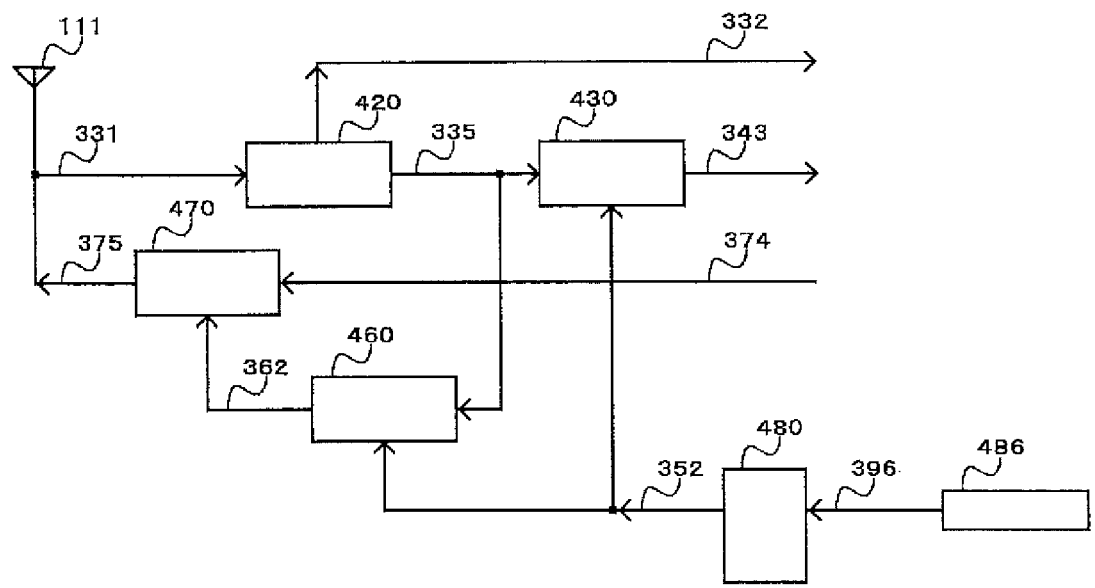
FIG. 5 shows a basic configuration of a wireless transmitter-receiver according to a fifth embodiment of the present invention.

A wireless transmitter-receiver according to a fifth embodiment of the present invention is explained. FIG. 5 shows a basic configuration of the wireless transmitter-receiver according to the fifth embodiment.

The wireless transmitter-receiver detects the present location thereof, decreases the upper limit value of transmission power, and also decreases the reception sensitivity in conjunction therewith if the wireless transmitter-receiver locates in the previously registered area. Namely, the transmission power and the reception sensitivity are decreased simultaneously.

The wireless transmitter-receiver according to this embodiment is the wireless transmitter-receiver according to the second embodiment which is added with a present position detecting area comparator 486 and a control signal generator 480 which is capable of processing request information 396. FIG. 14 shows a circuit example of the control signal generator 480.

The control signal generator 480 is provided with the present position detecting area comparator 486 on the input side.

The request information 396 is outputted from the present position detecting area comparator 486 and inputted to the control signal generator 480.

The present position detecting area comparator 486 detects the present location of the wireless transmitter-receiver, judges which the location is inside or outside of the area indicate by "previously registered area information", then judges whether the state of transmission power is to be switched or not, and outputs the result to the control signal generator 480 as the request information 396.

The control signal generator 480 generates and outputs a correction control signal 352 on the basis of the request information 396. The correction control signal 352 is outputted to a determination unit for transmission power 460 and simultaneously to a determination unit for communication compatibility 430.

Namely, the determination unit for transmission power 460 and the determination unit for communication compatibility 430 are controlled by a single operation.

Therefore, the wireless transmitter-receiver can switch transmission power to "decreased transmission power below normal" and restore to "normal transmission power" in accordance with the location of the wireless transmitter-receiver. Reception sensitivity is also switched to "decreased reception sensitivity below normal" and restored to "normal reception sensitivity" in conjunction with switching of transmission power.

Note that the correction control signal 352 inputted to the determination unit for communication compatibility 430 in the present embodiment corresponds to the "reference value in determining if the communication is compatible" in Invention 4.

Modification Example

A modification example in which a wireless transmitter-receiver according to the first to fifth embodiments is applied to the wireless transmitter-receiver in a mobile communication system and area information of a site of a hospital is registered in the "previously registered area information" is explained.

In the case when a picocell is installed in a hospital ward, the wireless transmitter-receiver that is set as a "partner in radio transmission and reception" by the picocell can suppress the transmission power. However, if the wireless transmitter-receiver, for example, is placed at the window and, therefore, the radio wave propagated from a radio base station located outside the site of the hospital is stronger, the wireless transmitter-receiver performs communication with high transmission power in accordance with the radio wave propagated from the radio base station outside and may consequently fail to suppress the transmission power.

Even in that case the wireless transmitter-receiver can securely suppress the transmission power in the site of the hospital by registering the area information of the site of the hospital in the "previously registered area information" as in the wireless transmitter-receiver according to the fourth embodiment.

Note that the picocell has a function of a radio base station in a mobile communication system, in particular, a small radio base station for in-building radio transmission and reception covering a limited small area with low transmission power.

In the first to fifth embodiments an example of the wireless transmitter-receiver is described, that is, the case in which when a user changes transmission power, a change is also given to the "reception system" at the same time to suppress the harmful influence caused by changing the transmission power and prevent the user from being confused.

In the first to fifth embodiments the examples of the wireless transmitter-receivers applied in a mobile communication system are described. However, the present invention can be employed in one-to-one communication such as a transceiver.

In the second to fifth embodiments the wireless transmitter-receiver measures the intensity of the received radio wave, controls transmission power on the basis thereof, and determines the state in which the suitable communication is expectable. However, in a digital communication system a wireless transmitter-receiver may measure the error rate of the received data as an alternative to measuring the intensity of the received radio wave, control reception sensitivity on the basis of the error rate, and determine the state in which the suitable communication is expectable.

In the first embodiment and the modification example a configuration wherein reception sensitivity is decreased in accordance with the upper limit value of power consumption decreased by an operation of an operation means 114. However, in a digital communication system not limited to the configuration above, a configuration wherein an allowance for an error rate of received data is decreased in accordance with the upper limit value of transmission power decreased by an operation of an operation means 114 can be employed. Concretely speaking, in the state of the "normal transmission power" the communication is determined compatible when the error rate of received data is not higher than a first threshold value (an allowance for the error rate), and in the state of the "decreased transmission power below normal" the communication is determined compatible when the error rate of received data is not higher than a second threshold value (an allowance for the error rate) that is lower than the first threshold value.

In the first to fifth embodiments and the modification examples, not limited to the configuration wherein transmission and reception are controlled with a single operation, (1) a configuration wherein transmission and reception are controlled with a plurality of operations, (2) a configuration wherein transmission is controlled with a first operation (a single or a plurality of operations) and then reception is controlled with a second operation (a single or a plurality of operations), (3) a configuration wherein reception is controlled with a first operation (a single or a plurality of operations) and then transmission is controlled with a second operation (a single or a plurality of operations), or (4) a configuration wherein transmission is controlled with a prescribed operation (a single or a plurality of operations) and reception is controlled without an operation so that the reception range and the transmission range coincides or the portion in which the both ranges do not coincide is minimized may be employed. Moreover, a prescribed operation which works as a trigger to control transmission or reception may act as a common operation to activate the other functions. For example, if the prescribed operation is made common to the operation to increase and decrease phone volume, the upper limit value of transmission power is decreased in association with the operation to lower phone volume.

In the first to fifth embodiments and the modification examples, the configuration, wherein the reception performance (for example, reception sensitivity, a reference value in determining if the communication is compatible, and an allowance for an error rate of received data) is decreased in accordance with the upper limit value of transmission power decreased by an operation of an operation means 114, is employed. However, not limited to the configuration above, for example, in the configuration wherein a wireless transmitter-receiver notifies a radio base station of the reception state and the radio base station controls transmission power, etc. on the basis of the reception state, a reception state in the case when reception performance is decreased or assumed to be decreased in accordance with the upper limit value of transmission power decreased by a prescribed operation may be notified to a partner in communication. In this configuration the wireless transmitter-receiver may decrease reception performance as in the first to fifth embodiments or need not to decrease reception performance. If the wireless transmitter-receiver actually decreases the reception performance, the wireless transmitter-receiver notifies a partner in communication of the reception state in which the reception performance is decreased in accordance with the decreased upper limit value of transmission power. Meanwhile, if the wireless transmitter-receiver does not decrease the reception performance and pretends to decrease the reception performance for the radio base station, the wireless transmitter-receiver notifies a partner in communication of the simulated reception state assuming that the reception performance is decreased in accordance with the decreased upper limit value of transmission power. The reception state is indicated in an analog communication system, for example, as "Present reception intensity is ##[dB]." and in a digital communication system, for example, as "Present error rate is ##." The transmitted signal only needs to contain the information of "##".

In the first embodiment and the modification example, the configuration wherein only the upper limit value of transmission power in the transmission power properties is decreased as shown in FIGS. 22(a) and (d) is employed. However, not limited to the configuration, for example, the configuration wherein the whole properties of transmission power are decreased may be employed. The same also applies to the second to fifth embodiments and the modification examples thereof.

In the first embodiment and the modification example, the configuration wherein the reception sensitivity is decreased to a fixed value 813 regardless of the propagation loss as shown in FIGS. 22(b) and (e) is employed. However, not limited to the configuration, for example, the configuration wherein the reception sensitivity is decreased stepwise from the maximum reception sensitivity to a fixed value 813 as the propagation loss increases may be employed. The same also applies to the second to fifth embodiments and the modification examples.

In the first embodiment and the modification example, the configuration wherein the wireless transmitter-receiver decreases the upper limit value of transmission power by an operation of an operation means 114 and decreases the reception sensitivity in accordance with the decreased upper limit value of transmission power is employed. However, the configuration wherein when the maximum transmission power 804 is used in FIG. 22 the wireless transmitter-receiver sets a lower value (fixed value 813) than the transmission power (maximum transmission power 804) needed for the communication with a radio base station as the upper limit value of transmission power to suppress transmission power may be employed. The same also applies to the second to fifth embodiments and the modification examples.

EXPLANATION OF LETTERS OR NUMERALS 111 antenna
112 sensitivity converter
114 operation means
116 means for detecting and processing various events
121 bandwidth limiter
122 sensitivity controller
123 automatic gain control amplifier
124 automatic gain control amplifier A
125 automatic gain control amplifier B
126 channel tuner
128 demodulator
129 reception level generator
141 level comparator
142 reference-value generator
161 level limiter
163 level arithmetic unit
171 carrier wave generator
172 modulator
173 transmission power controller
313 converted reception level signal
315 operation signal
331 received signal
332 demodulated signal
335 reception level signal
337 signal intensity information A
338 signal intensity information B
339 signal error rate information
343 determination signal for communication compatibility
352 correction control signal
362 transmission power control signal
374 modulating signal
375 transmission signal
391-399 request information
410, 420 receiving unit
430, 440 determination unit for communication compatibility
450, 480 control-signal generation unit
460 determination unit for transmission power
470 transmitting unit
481 operating direction processor
482 remote operating direction detecting processor
483 communication partner detecting comparator
484 wired earphone and microphone detector
485 wireless earphone and microphone detector
486 present position detecting area comparator
487 time information acquiring hours comparator
488 emergency call transmission detector
489 emergency warning reception detector
533 inverting amplifier built by means of an analog circuit
545 CPU
546 RAM
547 ROM
551 voltage-follower amplifier
553 comparator built by means of an analog circuit
554 adder built by means of an analog circuit
555 subtractor built by means of an analog circuit
556 adder built by means of a logic circuit
557 subtractor built by means of a logic circuit
558 weighted comparator built by means of a logic circuit
559 level limiter built by means of an analog circuit
564 PIN diode
565 zener diode
566 power amplifier
567 gain-changeable power amplifier
568 A/D converter
569 D/A converter
576 three-state buffer
577 flip-flop
578 analog switch
579 key switch
717 level restriction reference voltage
718 reference value
719 reference voltage
800 transmission power
801 reception sensitivity
802 reception intensity
803 propagation loss between a conventional wireless terminal (or a wireless transmitter-receiver according to a first embodiment) and a radio base station
804 maximum transmission power that a wireless transmitter-receiver (or a conventional wireless terminal) can exert
805 maximum reception sensitivity that a wireless transmitter-receiver (or a conventional wireless terminal) can exert
806 allowance
807, 812 range of the propagation loss where a wireless transmitter-receiver (or a conventional wireless terminal) can transmit a signal to a radio base station
808, 814 range of the propagation loss where a wireless transmitter-receiver (or a conventional wireless terminal) can receive a signal from a radio base station
809 range of the propagation loss where a conventional wireless terminal cannot transmit a signal to a radio base station
810 range of the propagation loss where a conventional wireless terminal cannot receive a signal from a radio base station
811, 813, 816 a fixed value
815 maximum reception intensity
911 key switch for setting transmission power and reception sensitivity to be normal
912 key switch for setting transmission power and reception sensitivity to be in lower states than normal
961 A user performs an operation for decreasing transmission power.
962 Transmission power decreases.
963 Reception sensitivity decreases.
964 Determines if fine communication is expectable
965 Expectable
966 Connected
967 Not expectable
968 Disconnected (Out of range)
971 indicator
972 hatching section indicating a set upper limit value of transmission power
973 black section indicating a present transmission power
974 sign of signal intensity when using normal reception sensitivity
975 sign of signal intensity when using decreased reception sensitivity
976 sign of simulated out-of-range (simulated out-of-range if highlighted)
977 sign of out-of-range
978 sign of transmission power
981 indicator
982 hatching section indicating a set upper limit value of transmission power
983 black section indicating a present transmission power
984 sign of signal intensity with normal reception sensitivity (left bars)

985 sign of signal intensity with decreased reception sensitivity (right bars)
986 sign of simulated out-of-range (simulated out-of-range if highlighted)
987 sign of out-of-range
988 sign of transmission power
991 transmission power
992 reciprocal of a reception level signal
993 correction control signal
994 transmission power characteristics without correction control
995 transmission power characteristics corrected by −10 [dB]
996 transmission power characteristics corrected by −20 [dB]
997 transmission power characteristics of a conventional wireless transmitter-receiver

The invention claimed is:

1. A wireless transmitter-receiver comprising:
an operation means for receiving an operation input by a user;
a transmission power decreasing means for decreasing an upper limit value of transmission power in response to the operation input by the user, the transmission power being a strength of a radio wave transmitted by the wireless transmitter-receiver; and
a reception performance decreasing means for decreasing reception performance so that the range in which the wireless transmitter-receiver can receive a signal from a radio base station coincides with the range in which the wireless transmitter-receiver can transmit a signal to the radio base station at the decreased transmission power upper limit value or so that the portion in which the both ranges do not coincide is minimized.

2. The wireless transmitter-receiver according to claim 1, characterized in that the reception performance is reception sensitivity.

3. The wireless transmitter-receiver according to claim 1, characterized in that the reception performance is a reference value in determining if the communication is compatible.

4. The wireless transmitter-receiver according to claim 1, characterized in that the reception performance is an allowance for an error rate of received data.

5. The wireless transmitter-receiver according to claim 1, characterized in that the transmission power decreasing means and the reception performance decreasing means respectively decrease the upper limit value of transmission power and the reception performance by a control signal generated by the prescribed operation.

6. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
the transmission power decreasing means and the reception performance decreasing means respectively decrease the upper limit value of transmission power and the reception performance by a control signal generated by a remote operation caused by the information transmitted from the outside.

7. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
when a call to a previously registered partner in an information transmission is made in a state in which the upper limit value of transmission power and the reception performance have been decreased, the upper limit value of transmission power that has been decreased returns to a normal value.

8. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
when a call from a previously registered partner in an information transmission is received in a state in which the upper limit value of transmission power and the reception performance have been decreased, the upper limit value of transmission power that has been decreased returns to a normal value.

9. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
when a connection of an earphone is detected in a state in which the upper limit value of transmission power and the reception performance have been decreased, the upper limit value of transmission power that has been decreased returns to a normal value.

10. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
when a connection of a microphone is detected in a state in which the upper limit value of transmission power and the reception performance have been decreased, the upper limit value of transmission power that has been decreased returns to a normal value.

11. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
when the wireless transmitter-receiver is located at a previously registered position the transmission power decreasing means and the reception performance decreasing means respectively decrease the upper limit value of transmission power and the reception performance.

12. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
when it is the time previously registered the transmission power decreasing means and the reception performance decreasing means respectively decrease the upper limit value of transmission power and the reception performance.

13. A wireless transmitter-receiver comprising:
a transmission power decreasing means for decreasing an upper limit value of transmission power by a prescribed operation; and
a reception performance decreasing means for decreasing reception performance so that the range in which the wireless transmitter-receiver can receive a signal from a radio base station coincides with the range in which the wireless transmitter-receiver can transmit a signal to the radio base station or so that the portion in which the both ranges do not coincide is minimized, wherein
when the wireless transmitter-receiver is located in a previously registered area the transmission power decreasing means and the reception performance decreasing means respectively decrease the upper limit value of transmission power and the reception performance.

14. A wireless transmitter-receiver comprising:
an operation means for receiving an operation input by a user;
a transmission power decreasing means for decreasing an upper limit value of transmission power by a prescribed in response to the operation input by the user, the transmission power being a strength of a radio wave transmitted by the wireless transmitter-receiver; and
a means for decreasing a reference value in determining if the communication is compatible so that the reception sensitivity is decreased by the same amount as the decreased amount of transmission power resulting from the decrease in transmission power upper limit value.

15. A wireless transmitter-receiver characterized in being provided with comprising:
an operation means for receiving an operation input by a user;
a transmission power decreasing means for decreasing an upper limit value of transmission power by a prescribed in response to the operation input by the user, the transmission power being a strength of a radio wave transmitted by the wireless transmitter-receiver; and
a means for decreasing an allowance for an error rate of received data so that the reception sensitivity is decreased by the same amount as the decreased amount of transmission power at the decreased transmission power upper limit value.

* * * * *